United States Patent
Rondeau et al.

(10) Patent No.: US 7,121,371 B2
(45) Date of Patent: Oct. 17, 2006

(54) ALL TERRAIN VEHICLE WITH A SEAT BACKREST

(75) Inventors: Pierre Rondeau, St-Denis-de-Brompton (CA); Claude Gagnon, Magog (CA); Martin Portelance, Sherbrooke (CA); Eric Dube, Rock-Forest (CA); Martin Gagne, Valcourt (CA); Daniel Nadeau, St-Denis-de-Brompton (CA); Charles Bombardier, Orford (CA)

(73) Assignee: Bombardier Recreational Products Inc., Valcourt (CA)

( * ) Notice: Subject to any disclaimer, the term of this patent is extended or adjusted under 35 U.S.C. 154(b) by 0 days.

(21) Appl. No.: 10/647,780

(22) Filed: Aug. 26, 2003

(65) Prior Publication Data

US 2004/0129484 A1 Jul. 8, 2004

Related U.S. Application Data

(60) Division of application No. 10/292,813, filed on Nov. 13, 2002, which is a continuation-in-part of application No. 09/950,926, filed on Sep. 13, 2001, now Pat. No. 6,659,566.

(60) Provisional application No. 60/475,511, filed on Jun. 4, 2003, provisional application No. 60/393,114, filed on Jul. 3, 2002, provisional application No. 60/384,822, filed on Jun. 4, 2002, provisional application No. 60/331,252, filed on Nov. 13, 2001, provisional application No. 60/232,572, filed on Sep. 13, 2000.

(51) Int. Cl.
*B62D 23/00* (2006.01)

(52) U.S. Cl. ..................................... 180/89.1

(58) Field of Classification Search ............... 180/89.1, 180/89.11, 908; 280/164.1, 164.2; 296/64; 297/183.1, 243
See application file for complete search history.

(56) References Cited

U.S. PATENT DOCUMENTS 3,647,097 A 3/1972 Skaggs (Continued)

FOREIGN PATENT DOCUMENTS

EP 0 953 499 A2 11/1999

(Continued)

OTHER PUBLICATIONS

"Super All-Terrain Test Caged Grizzly!," Dirt Wheels, Nov. 1999, pp. 41-45.

(Continued)

*Primary Examiner*—Faye M. Fleming
(74) *Attorney, Agent, or Firm*—Osler, Hoskin & Harcourt LLP

(57) ABSTRACT

An ATV is described with a frame and at least three wheels suspended from the frame. At least one of the wheels is a front wheel and at least one of the wheels is a rear wheel. The front wheel defines a front axis and the rear wheel defines a rear axis. A power unit drives at least one of the wheels on the frame. A straddle-type seat is provided with a main seat portion for a driver and a secondary seat portion, rearward of the main portion, for a passenger. A back rest is also provided for the secondary seat portion, the back rest having a back-supporting front surface positioned in front of the rear axis. At least one of the wheels is steered by a steering member.

9 Claims, 23 Drawing Sheets

U.S. PATENT DOCUMENTS

| | | |
|---|---|---|
| 4,126,357 A | 11/1978 | Day |
| 4,247,030 A | 1/1981 | Amacker |
| 4,270,786 A | 6/1981 | Mattox |
| 4,277,008 A | 7/1981 | McCleary |
| 4,300,706 A | 11/1981 | Hendrick et al. |
| 4,349,138 A | 9/1982 | Bruhn |
| 4,451,057 A | 5/1984 | Lawson |
| 4,648,617 A | 3/1987 | Hannappel |
| 4,691,963 A | 9/1987 | Mikuniya et al. |
| 4,706,770 A | 11/1987 | Simon |
| 4,721,178 A | 1/1988 | Ito |
| D298,811 S | 12/1988 | Morita |
| 4,800,986 A | 1/1989 | Hayes, III |
| 4,821,825 A | 4/1989 | Somerton-Rayner |
| 4,826,057 A | 5/1989 | Yamada |
| 4,860,850 A | 8/1989 | Takahashi |
| D305,999 S | 2/1990 | Ueda et al. |
| 5,026,119 A * | 6/1991 | Frank et al. ............. 297/383 |
| 5,036,939 A | 8/1991 | Johnson et al. |
| 5,060,748 A | 10/1991 | Iwai et al. |
| 5,076,387 A | 12/1991 | Oka |
| D324,666 S | 3/1992 | Haag et al. |
| D325,360 S | 4/1992 | Saito et al. |
| 5,109,942 A | 5/1992 | Akimori et al. |
| 5,174,622 A | 12/1992 | Gutta |
| 5,224,636 A | 7/1993 | Bounds |
| 5,267,780 A | 12/1993 | Friesen et al. |
| 5,314,239 A | 5/1994 | Edwards et al. |
| 5,327,989 A | 7/1994 | Furuhashi et al. |
| 5,360,259 A | 11/1994 | Lemberger |
| 5,433,357 A | 7/1995 | Alliff |
| 5,458,390 A * | 10/1995 | Gilbert ............. 296/78.1 |
| D364,590 S | 11/1995 | Yamashita |
| 5,476,146 A | 12/1995 | Brown |
| 5,480,214 A | 1/1996 | Rogers |
| 5,558,260 A | 9/1996 | Reichert |
| 5,597,211 A | 1/1997 | Golden |
| 5,765,917 A | 6/1998 | Johnson |
| 5,816,462 A | 10/1998 | Brantley |
| 5,845,918 A | 12/1998 | Grinde et al. |
| D405,029 S | 2/1999 | Deutschman |
| 5,997,067 A | 12/1999 | Shambeau et al. |
| 5,997,088 A | 12/1999 | Stark et al. |
| 6,012,770 A | 1/2000 | Rubin |
| 6,016,943 A | 1/2000 | Johnson et al. |
| 6,029,750 A | 2/2000 | Carrier |
| D422,938 S | 4/2000 | Molzon et al. |
| D427,109 S | 6/2000 | Molzon et al. |
| 6,105,721 A * | 8/2000 | Haynes ............. 182/127 |
| 6,116,630 A | 9/2000 | Thomas |
| D436,557 S | 1/2001 | Selby et al. |
| 6,182,784 B1 | 2/2001 | Pestotnik |
| D439,548 S | 3/2001 | Kouchi et al. |
| D439,549 S | 3/2001 | Shambeau et al. |
| 6,209,941 B1 | 4/2001 | Cross |
| D445,066 S | 7/2001 | Hinklin et al. |
| 6,270,106 B1 | 8/2001 | Maki et al. |
| 6,296,163 B1 | 10/2001 | Kitao et al. |
| 6,343,669 B1 | 2/2002 | Davis et al. |
| 6,378,748 B1 | 4/2002 | Cox |
| 6,461,095 B1 | 10/2002 | Puska |
| 6,508,511 B1 | 1/2003 | Kolpin |
| 6,622,806 B1 | 9/2003 | Matsuura |
| 6,672,916 B1 | 1/2004 | Lent-Phillips et al. |
| 6,698,782 B1 | 3/2004 | Bouchard |
| 6,755,269 B1 | 6/2004 | Davis et al. |
| 2002/0027038 A1 | 3/2002 | Rioux et al. |
| 2002/0179358 A1 | 12/2002 | Bombardier |
| 2003/0150659 A1 | 8/2003 | Fournier et al. |
| 2004/0031640 A1 | 2/2004 | Tweet |
| 2004/0206568 A1 | 10/2004 | Davis et al. |

FOREIGN PATENT DOCUMENTS

| | | |
|---|---|---|
| EP | 1 157 918 A2 | 11/2001 |
| EP | 1 205 379 A1 | 5/2002 |
| JP | 2000313318 | 11/2000 |
| WO | WO 00/76794 A1 | 12/2000 |
| WO | WO 03/042026 A1 | 5/2003 |
| WO | 03/053769 A1 | 7/2003 |

OTHER PUBLICATIONS

"Mule 550—2500—2500—2510—2520," Kawasaki Catalog.
"Polarais, 1999 Big Boss 500, 6×6," www.polarisindustries.com/product.cfm?Product=175, Oct. 8, 1999, 1 page.
"Polaris, 1999 Big Boss 500, 6×6," www.polarisindustries.com/cat.cfm?SubcatID=43, Oct. 8, 1999, 3 pages.
"Polaris RANGER," www.polarisindustries.com/product.cfm?PRODUCT=82 , Oct. 8, 1999, 2 pages.
"Home & Shop Journal," Popular Mechanics, May 1996, page 105.
"Over the Bars," Dirt Wheels, Dec. 1999, page 10.
"Argo 6×6 Vanguard/Vanguard 2," ARGO Models—Vanguard, www.argoatv.com/argo-models-vanguard.html, Jun. 5, 2000.
Photographs of Yamaha Pro Hauler, 1989, 4 sheets.
2002 Arctic Cat Brochure, 2001.
QuadRunner LT-F250T, 1996.
Polaris Sportsman 500, 2000.
Polaris Recreational Vehicles, 2002.
VTT, 2001.
VTT, 2000.
Kawasaki, Vehicules Tout Terrain, 2000.
2000 Honda Sport ATVS, Jul. 1999.
Suzuki QuadRunners, 2000.
Arctic Cat, Vos Horizons, 2000.
Honda Utility ATVS, 2000.
Honda Fourtrax, 1999.
Honda Utility ATVs, 1999.
Polaris, All Terrain Vehicles, 1999.
Yamaha ATVS, 1999.
Bombardier Recreational Products, ATV Connection Magazine, Sep. 15, 2000, pp. 1-10.
Bombardier Operator's Guide, Traxtor/XT/XL/Autoshift/Footshift, dated in year 2000, 4 pgs.

* cited by examiner

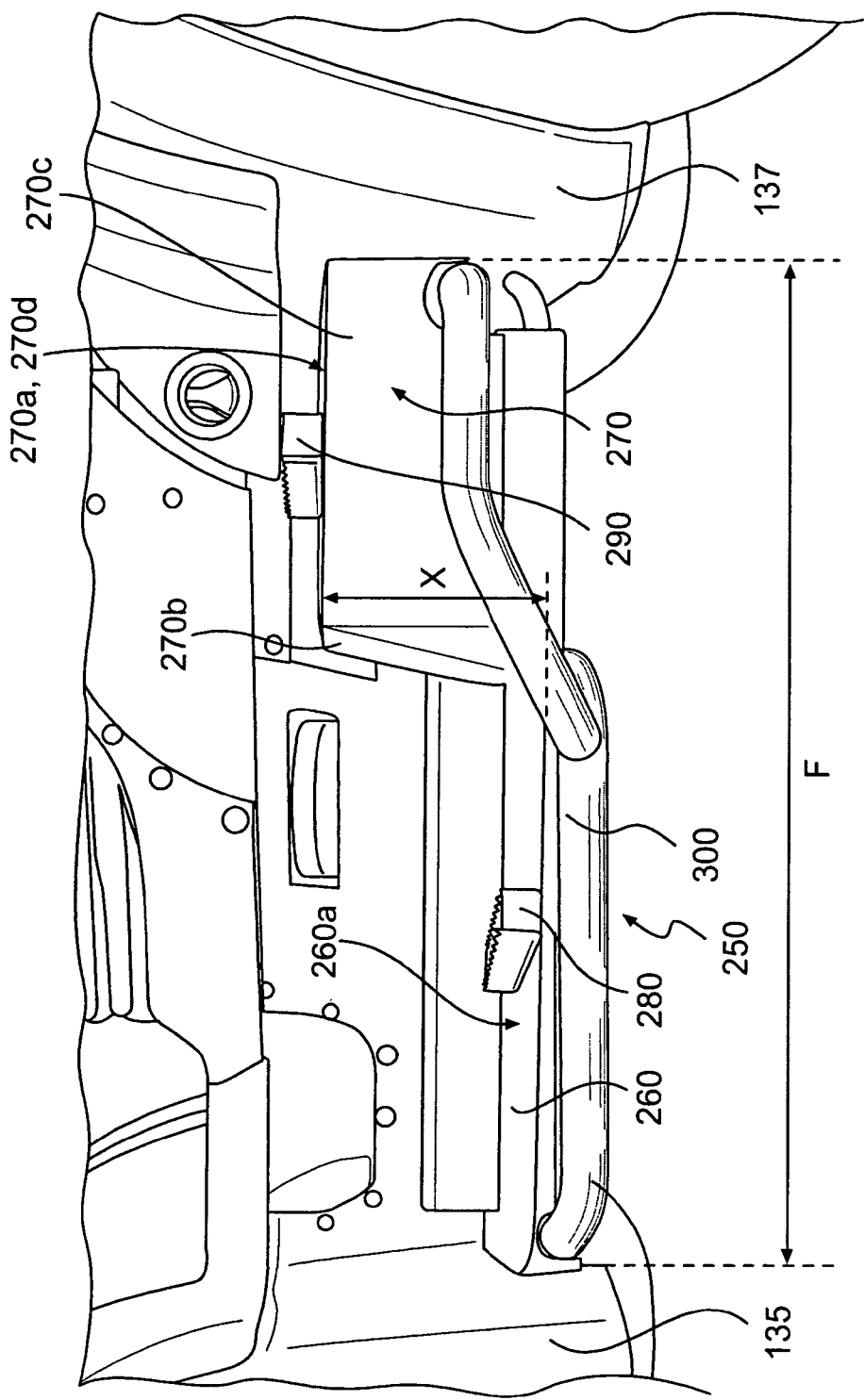

ALL TERRAIN VEHICLE WITH A SEAT BACKREST

CROSS-REFERENCE

This application is a Divisional of U.S. Utility patent application Ser. No. 10/292,813, titled "ATV WITH IMPROVED DRIVER POSITIONING AND/OR MULTI PASSENGER CAPACITY," filed on Nov. 13, 2002, which is a continuation-in-part of U.S. Utility patent application Ser. No. 09/950,926 titled "CARGO CARRYING COMPARTMENTS OF AN ALL TERRAIN VEHICLE," filed on Sep. 13, 2001, the contents of both of which are incorporated herein by reference.

Through application Ser. No. 09/950,926, this application claims further priority to U.S. Provisional Patent Application No. 60/232,572 titled "CARGO CARRYING COMPONENTS OF AN ALL TERRAIN VEHICLE," filed on Sep. 13, 2000, which is incorporated herein by reference.

Through application Ser. No. 10/292,813, this application also claims priority to U.S. Provisional Patent Application No. 60/331,252 titled "ATV WITH IMPROVED DRIVER POSITIONING AND/OR MULTI PASSENGER CAPACITY," filed on Nov. 13, 2001, which is incorporated herein by reference.

Through application Ser. No. 10/292,813, this application also claims priority to U.S. Provisional Patent Application No. 60/393,114 titled "ATV WITH IMPROVED DRIVER POSITIONING AND/OR MULTI PASSENGER CAPACITY," filed on Jul. 3, 2002, which is incorporated herein by reference.

Through application Ser. No. 10/292,813, this application also claims priority to U.S. Provisional Patent Application No. 60/384,822 titled "ATV WITH IMPROVED DRIVER POSITIONING AND/OR MULTI PASSENGER CAPACITY," filed on Jun. 4, 2002, which is incorporated herein by reference.

This application also claims priority to U.S. Provisional Patent Application No. 60/475,511 titled "ATV WITH IMPROVED DRIVER POSITIONING AND/OR MULTI PASSENGER CAPACITY," filed on Jun. 4, 2003, which is incorporated herein by reference.

FIELD OF THE INVENTION

This invention relates to all-terrain vehicles (ATVs), and in particular ATVs in which two riders (a driver and a passenger) can be accommodated. The present invention also relates to the seat positioning of the driver and/or passenger on the ATV.

BACKGROUND OF THE INVENTION

Conventionally, the term ATV or all-terrain vehicle has been limited to straddle-seat, wheeled vehicles that are constructed to accommodate just one rider/driver. The Consumer Product Safety Commission uses the one-rider limitation to define "ATV" due to the belief that straddle-seat, wheeled vehicles could not safely accommodate more than one rider.

As illustrated in FIGS. 11A and 11B, despite numerous warnings that a conventional ATV 1000 is designed for just one driver 1010, in practice, a passenger 1020 often rides on the one-person ATV 1000. Placing two riders 1010, 1020 on the one-rider ATV 1000 creates several problems. First, as illustrated in FIG. 11A, because the seat of the one-person ATV 1000 is designed to accommodate just one rider, the passenger 1020 must uncomfortably squeeze onto the ATV's one-person seat between the driver 1010 and a rear rack 1030. Second, as illustrated in FIG. 11B, a footrest 1040 of the ATV 1000 is similarly designed to only be long enough to accommodate the feet of the one intended rider 1010. The wheelbase of the ATV 1000 limits the space between front and rear fenders 1050, 1060. Consequently, the driver 1010 and passenger 1020 must uncomfortably share the one-person footrest 1040. Third, because the driver 1010 and passenger 1020 must be so tightly squeezed together, the legs of the passenger 1020 inhibit the ability of the driver 1010 to move, while the body of the driver 1010 inhibits the ability of the passenger 1020 to move. Such limited mobility disadvantageously limits the abilities of both riders 1010, 1020 to actively position themselves (e.g., lean into curves or slopes to stabilize the ATV 1000). Fourth, as shown in FIG. 11A, a center of gravity of the passenger 1020 is longitudinally positioned at, near, or even behind a rear wheel axis 1070 of the ATV 1000 such that the back of the passenger 1020 is disposed rearwardly of the rear wheel axis 1070. Such positioning disadvantageously shifts the combined center of gravity of the ATV 1000 and riders 1010, 1020 rearwardly, thereby increasing the risk of tipping the ATV 1000.

As illustrated in FIGS. 12A and 12B, a conventional after-market passenger seat 1100 was developed in an attempt to provide a seat for the passenger 1020 that can be attached to a conventional one-person ATV like the ATV 1000. While the passenger seat 1100 provides more longitudinal space for the passenger 1020, it suffers from many of the same deficiencies encountered when the passenger 1020 rides on the ATV 1000 without a passenger seat 1100 (as shown in FIGS. 11A and 11B). Furthermore, the seat 1100 creates additional problems for the ATV 1000 and riders 1010, 1020. First, in order to give the passenger 1020 more longitudinal space, the seat 1100 must be shifted far to the rear of the ATV 1000. As illustrated in FIG. 12A, such positioning places the center of gravity of the passenger 1020 well behind the rear wheel axis 1070 of the ATV 1000, which results in a combined ATV 1000 and rider 1010, 1020 center of gravity that is farther behind the rear wheel axis as compared to the dual-rider situation shown in FIGS. 11A and 11B. Second, because the passenger seat 1100 is positioned on top of the conventional rear rack 1030 of the ATV 1000, the passenger seat 1100 places the center of gravity of the passenger 1020 in an elevated position on the ATV 1000, which further impairs the stability of both the passenger 1020 and the ATV 1000. Furthermore, as illustrated in FIG. 12B, the extremely elevated position of the seat 1100 relative to the driver's seat could cause the knees of the passenger 1020 to interfere with the elbows of the driver 1010. Fourth, upwardly extending, rigid sides 1110 of the seat 1100 force the legs of the passenger 1020 laterally inwardly, which further reduces the mobility of both the driver 1010 and the passenger 1020 and impairs their abilities to actively position themselves during operation of the ATV 1000. Still further, placing the passenger seat 1100 on top of the rear rack 1030 disadvantageously eliminates the storage space on the rear rack 1030. While the passenger seat 1100 opens up to provide a small, internal storage compartment, such a storage compartment is quite limited as compared to the large, open space provided above the rear rack 1030 when the passenger seat 1100 is removed.

Amacker (U.S. Pat. No. 4,247,030) discloses a passenger seat for an ATV that is similar to the after-market passenger seat 1100 illustrated in FIGS. 12A and 12B and suffers from many of the same shortcomings. As illustrated in FIG. 3 of Amacker, the passenger's center of gravity is disposed well behind the rear axis and therefore disadvantageously increases the risk of rearward rollover of the ATV. Furthermore, both the passenger's legs and feet and the driver's legs and feet must be disposed at the same longitudinal position on the ATV, which causes the driver and the passenger to interfere with each other's mobility and thereby inhibit their ability to actively position themselves.

SUMMARY OF THE INVENTION

The inventors of the present invention determined that if multiple riders are going to ride ATVs that are designed for one rider despite all contraindications and/or other warnings, then ATVs should be constructed to safely accommodate multiple riders. Accordingly, through the present invention, the inventors resolved safety concerns of the industry regarding multi-person ATVs.

Accordingly, one aspect of embodiments of the invention provides an ATV that can safely accommodate two riders (a driver and a passenger). For example, the wheelbase of the ATV can be extended (e.g., by about 8" to 12" or more) compared to conventional ATVs such that the driver is more centered between the front and rear wheels, which creates additional space to accommodate an additional rider behind the driver. An advantage to this structure is that the driver's riding position is more active and comfortable, and the passenger can be accommodated in a safe manner.

Another aspect of embodiments of the invention provides an ATV on which a single rider, i.e., the driver, can be placed in a position that is more centered between the front and rear pairs of wheels, thereby improving driver comfort and/or reducing the chances for roll-over of the ATV.

Another aspect of embodiments of the present invention provides a two-person ATV that allows the driver and passenger to actively position themselves during operation of the ATV.

Still another aspect of the present invention provides for an ATV with a frame and at least three wheels suspended from the frame. At least one of the wheels is a front wheel and at least one of the wheels is a rear wheel. Each of the wheels includes an ATV-type tire, i.e. a low-pressure balloon tire having an air pressure of less than 1 kg/cm². The front wheel defines a front axis and the rear wheel defines a rear axis. A power unit drives at least one of the wheels on the frame. A straddle-type seat is provided with a main seat portion for a driver and a secondary seat portion, rearward of the main portion, for a passenger. A back rest is also provided for the secondary seat portion, the back rest having a back-supporting front surface positioned in front of the rear axis. At least one of the wheels is steered by a steering member.

One further aspect of the present invention provides for an ATV with only four wheels, two of which are front wheels and two of which are rear wheels. The front wheels define the front axis and the rear wheels define the rear axis. Each of the wheels includes an ATV-type tire. Handlebars function as the steering member.

Another aspect of the present invention provides for an ATV where the front axis and the rear axis define a wheelbase of greater than 52 inches.

One further aspect of the present invention provides for an ATV where the front axis and the rear axis define a wheelbase of greater than 54 inches.

Yet another aspect of the present invention provides for an ATV where the front axis and the rear axis define a wheel base of between 52 and 72 inches.

Still another aspect of the present invention provides for an ATV where the front axis and the rear axis define a wheel base of between 55 and 72 inches.

One further aspect of the present invention provides for an ATV where the front axis and the rear axis define a wheel base of between 55 and 65 inches.

Another aspect of the present invention provides for an ATV where the front axis and the rear axis define a wheel base of between 56 and 64 inches.

One further aspect of the present invention provides for an ATV where the back-supporting front surface of the back rest is positioned in front of the rear axis by over 1 inch.

Still another aspect of the present invention provides for an ATV where the back-supporting front surface of the back rest is positioned in front of the rear axis by over 3 inches.

Yet another aspect of the present invention provides for an ATV that includes a back rest support that extends between the back rest and the ATV.

A further aspect of the present invention provides for an ATV with two laterally-spaced back rest supports that extend between laterally-spaced portions of the back rest and the ATV.

Another aspect of the present invention provides for an ATV with a frame and at least three wheels suspended from the frame. At least one of the wheels is a front wheel and at least one of the wheels is a rear wheel. The front wheel defines a front axis and the rear wheel defines a rear axis. A power unit drives at least one of the wheels. The ATV includes a straddle-type seat with a main seat portion for a driver and a secondary seat portion, rearward of the main portion, for a passenger. The seat has a rearward end disposed in front of the rear axis. The ATV includes a steering member for steering at least one of the wheels.

A further aspect of the present invention provides for an ATV where the rearward end of the seat is positioned in front of the rear axis by over 1 inch.

Another aspect of the present invention provides for an ATV where the rearward end of the seat is positioned in front of the rear axis by over 3 inches.

Another aspect of the present invention provides for an ATV where the secondary seat portion includes a secondary supporting range that is entirely positioned in front of the rear axis.

Additional and/or alternative aspects of the embodiments of the present invention will be described in or apparent from the following description of the preferred embodiments.

BRIEF DESCRIPTION OF THE DRAWINGS

FIG. 5C is a left side view of the left footrest of the ATV shown in FIG. 1;

DETAILED DESCRIPTION OF PREFERRED EMBODIMENTS

FIGS. 1–9 show an ATV 100 according to a preferred embodiment of the present invention.

Throughout this description, unless otherwise expressly stated, all dimensions and relationships between elements are measured when the ATV 100 is unloaded (i.e., without riders or baggage), has a full oil reservoir and tank of fuel, is on level ground, and is steered straight forward. Furthermore, unless otherwise indicated, the driver and passenger have the weight and dimensions of a standard rider. The standard rider is a $50^{th}$ percentile human male who weighs 78 kg and has the dimensions illustrated in FIGS. 13 and 14.

Throughout this description, the term ATV shall not be limited to the conventional one-rider definition. Rather, the ATV 100 is still referred to as an ATV despite the fact that it is designed to accommodate a driver and a passenger, and could be designed to accommodate a driver and multiple passengers. Moreover, the ATV 100 is designed to comfortably accommodate just the driver as well.

Figure 1:
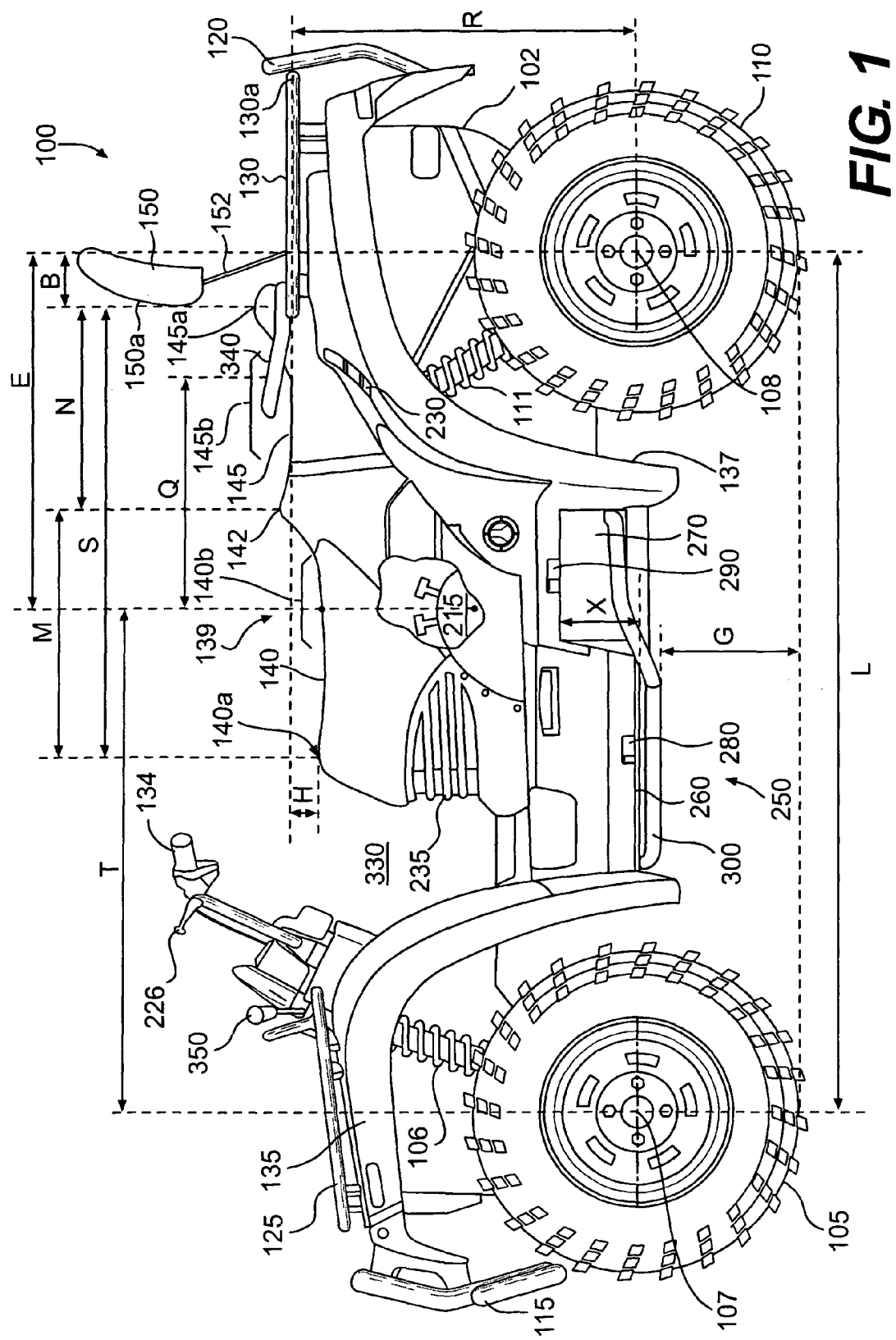
FIG. 1 is a left side view of an ATV according to a preferred embodiment of the present invention.
Figure 2A:
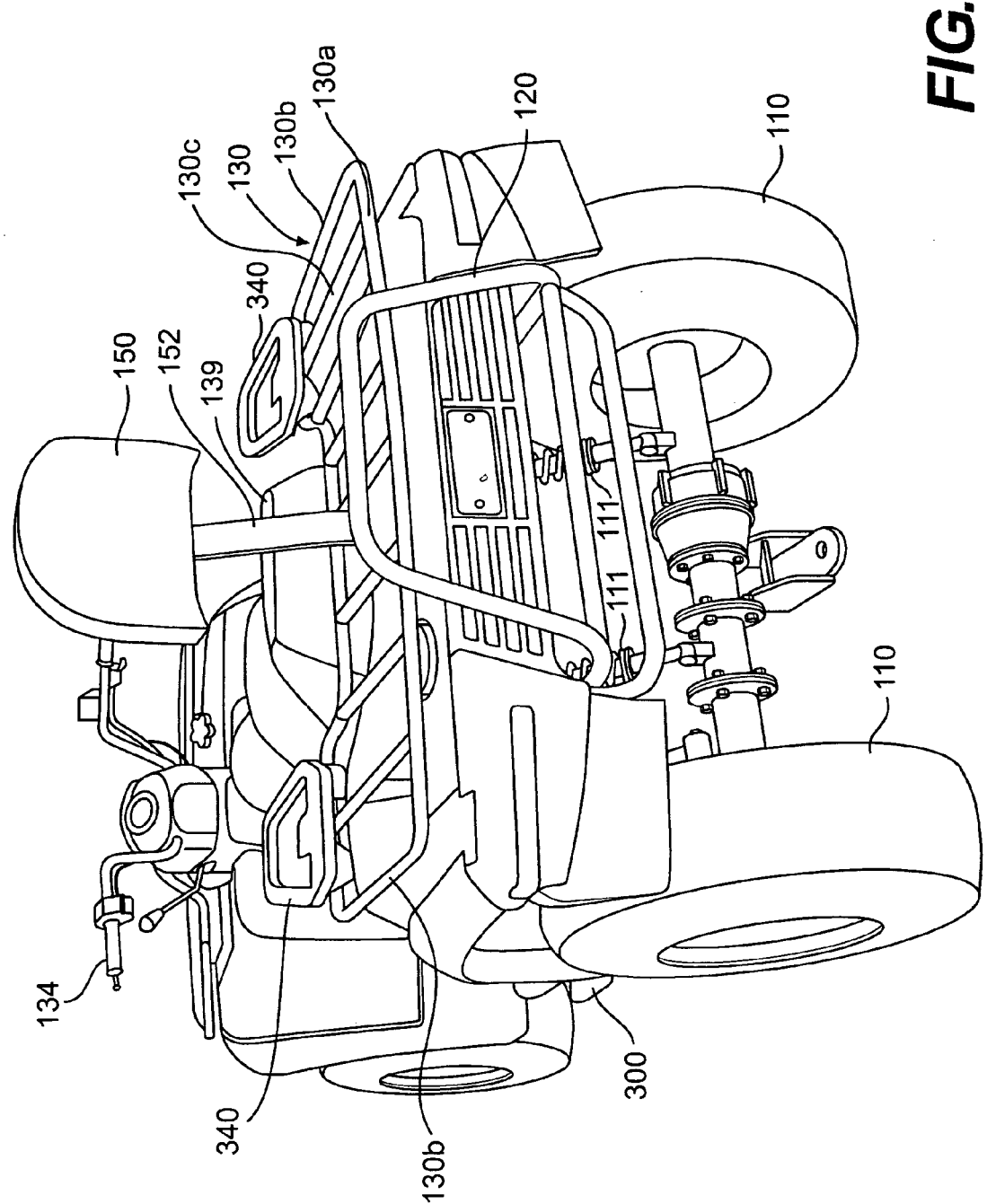
FIG. 2A is a perspective view of the rear, left side of the ATV shown in FIG. 1.
Figure 2B:
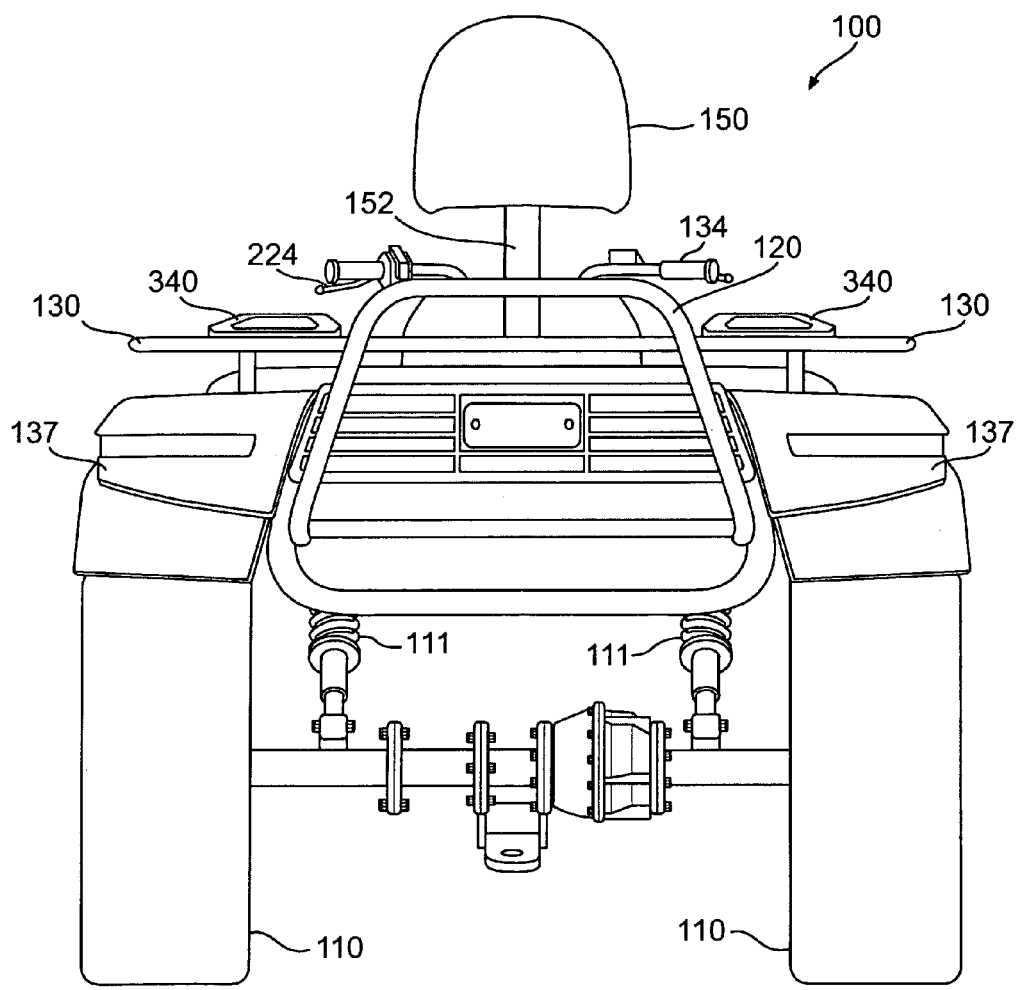
FIG. 2B is a rear view of the ATV shown in FIG. 1.

As shown in FIG. 1, the ATV 100 includes a frame 102 that supports a pair of laterally-spaced, front wheels 105 and a pair of laterally-spaced, rear wheels 110. The wheels 105, 110 are preferably equally sized. The wheels preferably have a diameter of between about 20 to 30 inches, and more preferably about 25 inches.

A wheelbase L, defined between the axes of rotation 107, 108 of the wheels 105, 110, respectively, is significantly longer than in conventional ATVs, and is preferably at least about 8 to 14 inches longer than conventional ATV wheelbases. Preferably, the wheelbase is about 10 to 12 inches longer than a standard ATV wheelbase. Specifically, the wheelbase L is preferably between 52 and 72 inches, is more preferably between 55 and 65 inches, is even more preferably between 56 and 64 inches, and is even more preferably about 61 inches. As discussed in greater detail below, the elongated wheelbase L provides numerous advantages over shorter conventional ATVs. These advantages may include improved stability (less susceptibility to tipping or rolling), a more comfortable ride for the driver, the comfortable facilitation of a seat for a passenger, active positioning of the driver and passenger, and reduced physical interference between the driver and passenger (i.e., via increased space for the driver and passenger and/or improved driver and passenger mobility).

If greater than four wheels are provided on the ATV 100, the wheelbase L should be measured over the longest longitudinal span between longitudinally adjacent axes. For example, if the ATV comprises six wheels (three pairs of longitudinally spaced wheels), the wheelbase L should be measured as the longer of (a) the distance between the front and middle pairs of wheels, and (b) the distance between the middle and rearward pairs of wheels. Similarly, the front and rear wheels are defined as the most-longitudinally-spaced-apart, longitudinally adjacent wheels. Consequently, "front" and "rear" wheels are defined relative to each other and not relative to additional wheels that may also be present on the ATV.

The frame 102 is similar to a conventional ATV frame except that the frame 102 is extended to provide for the extended wheelbase L. Additional longitudinal structural elements may be added to the frame 102 to strengthen the frame 102 over the extended gap between the wheels 105, 110.

As shown in FIG. 1, the illustrated ATV 100 has a ground clearance G, which is similar to the ground clearance of conventional ATVs. The ground clearance G is defined by the vertical distance between the ground and the lowest point on the frame 102 and is preferably about 10 inches. However, as the wheelbase L elongates more and more, a change in ground clearance should be further considered. For example, if the wheelbase L is extended further, the ground clearance G should be increased accordingly.

While the illustrated ATV 100 includes four wheels 105, 110, the ATV 100 could alternatively include just three wheels (e.g., two rear wheels and a single front wheel or two front wheels and a single rear wheel). The front wheels 105 are suspended from the frame 102 by an appropriate front suspension 106, while the rear wheels 10 are suspended from the frame 102 by an appropriate rear suspension 111. The ATV 100 includes a front bumper 115 and a rear bumper 120, and a front rack 125 and a rear rack 130. A steering member, e.g., a pair of handlebars 134, is positioned just behind the front rack 125 and is operably coupled to the front wheels 105 for steering purposes. The ATV 100 includes front fenders 135 positioned above the front wheels 105 and rear fenders 137 positioned above the rear wheels 110.

As best illustrated in FIGS. 2A, 3A, 3C and 3D, the rear rack 130 preferably comprises a plurality of interconnected, elongated members, which are preferably tubular. A rear member 130a defines a rearward end of the rear rack 130. Similarly, side members 130b define the outer lateral sides of the rear rack 130. A plurality of interior members 130c are also provided. It should be noted, however, that the structure of the rear rack 130 may be modified or the rear rack 130 may be eliminated entirely without deviating from the scope of the present invention.

As illustrated in FIGS. 1, 2A, 3A, and 3B, the ATV 100 includes a straddle-type seat 139 that includes a main seat portion 140 and a secondary seat portion 145, which are connected together with a transition 142, which may provide a definite dividing line between the main and secondary seat portions 140, 145. Because the transition 142 angles upwardly at approximately a 45 degree angle from the main seat portion 140 to the secondary seat portion 145, the transition 142 generally provides a rear portion to the main seat portion 140 that tends to discourage the driver (i.e., the person sitting in the main seat portion 140) from sliding rearwardly onto the secondary seat portion 145. Alternatively, a precise transition 142 may be eliminated altogether such that the main and secondary seat portions 140, 145 together form a single, elongated, seat portion. Furthermore, the transition may comprise a gap between the main and secondary seat portions 140, 145 such that the seat 139 has two separated portions.

Because the seat 139 is a two-person seat rather than a conventional one-person seat, a longitudinal length S of the seat 139 formed between a forward end 140a of the main seat portion 140 and a rearward end 145a of the secondary seat portion 145a is significantly longer than in the prior art. The length S is preferably between 30 and 60 inches, is more preferably between 31 and 50 inches, is even more preferably between 32 and 45 inches, and is even more preferably about 37 inches.

The forward end 140a of the seat 139 is defined as a point that is slightly rearward (preferably 2–5 inches) of the rear end of the handlebars 134. The forward end 140a is also preferably disposed slightly forward or at the same longitudinal position as a heel stop 280 of a footrest 250. Alternatively, if handlebars 134 are not provided or do not reasonably define the forward end 140a of the seat, the forward end 140a is defined as the forwardmost longitudinal position on the seat 139 that is designed to support any portion of the driver. While the vast variation in conventional seat styles and shapes makes it difficult to precisely define the forward end 140a of a seat of every different ATV without specific reference to each different seat style, a forward end of a seat of any ATV is readily determinable by one of ordinary skill in the art.

The rearward end 145a of the seat 139 is defined by a longitudinal position of a forward surface 150a of a back rest 150 of the ATV 100. However, if a back rest 150 is not provided on the ATV 100, the rearward end 145a is quantitatively defined by the rearwardmost longitudinal position on the seat 139 that is designed to support any portion of the passenger.

Figure 3A:
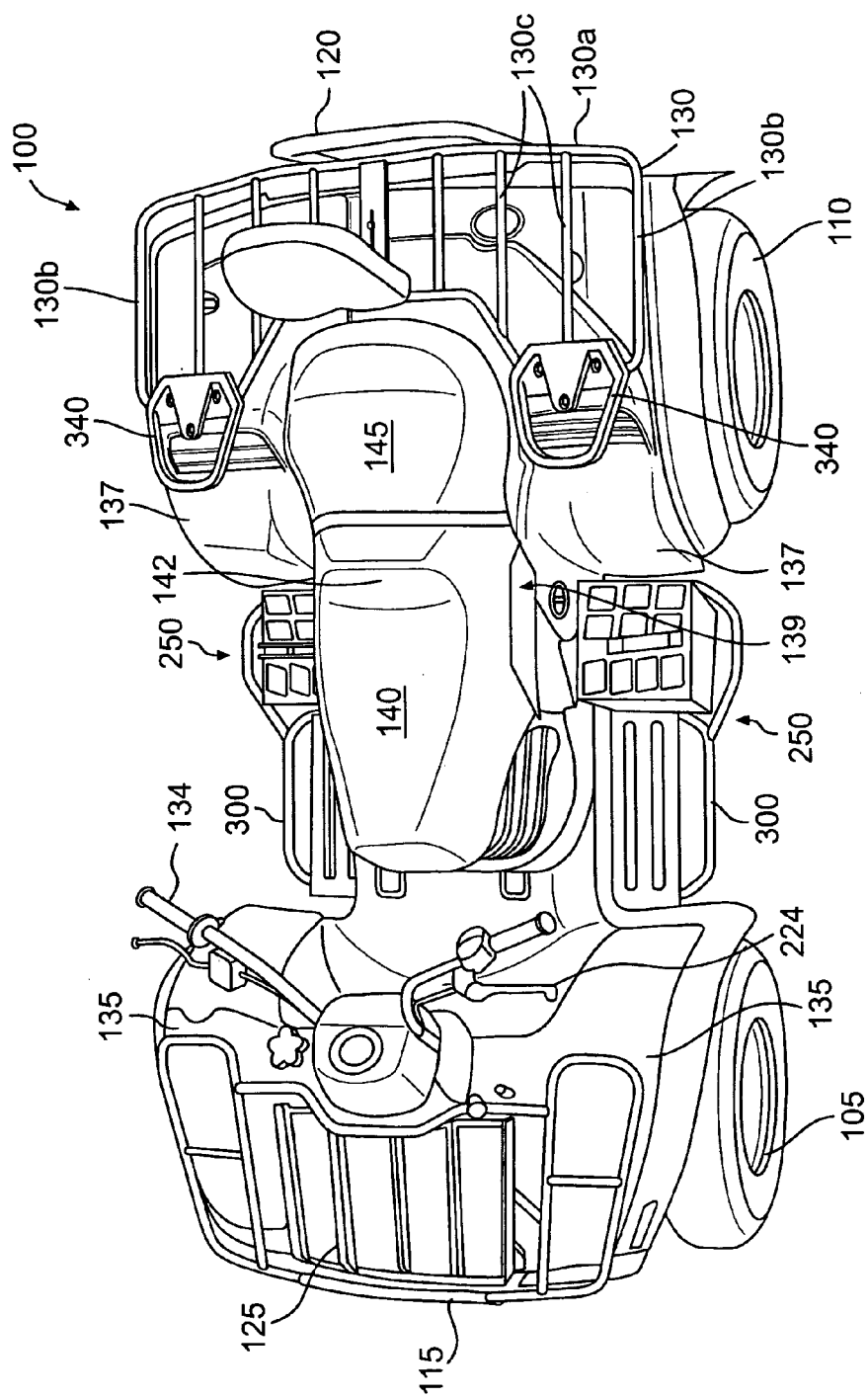
FIG. 3A is a perspective view of the top, left side of the ATV shown in FIG. 1.
Figure 3B:
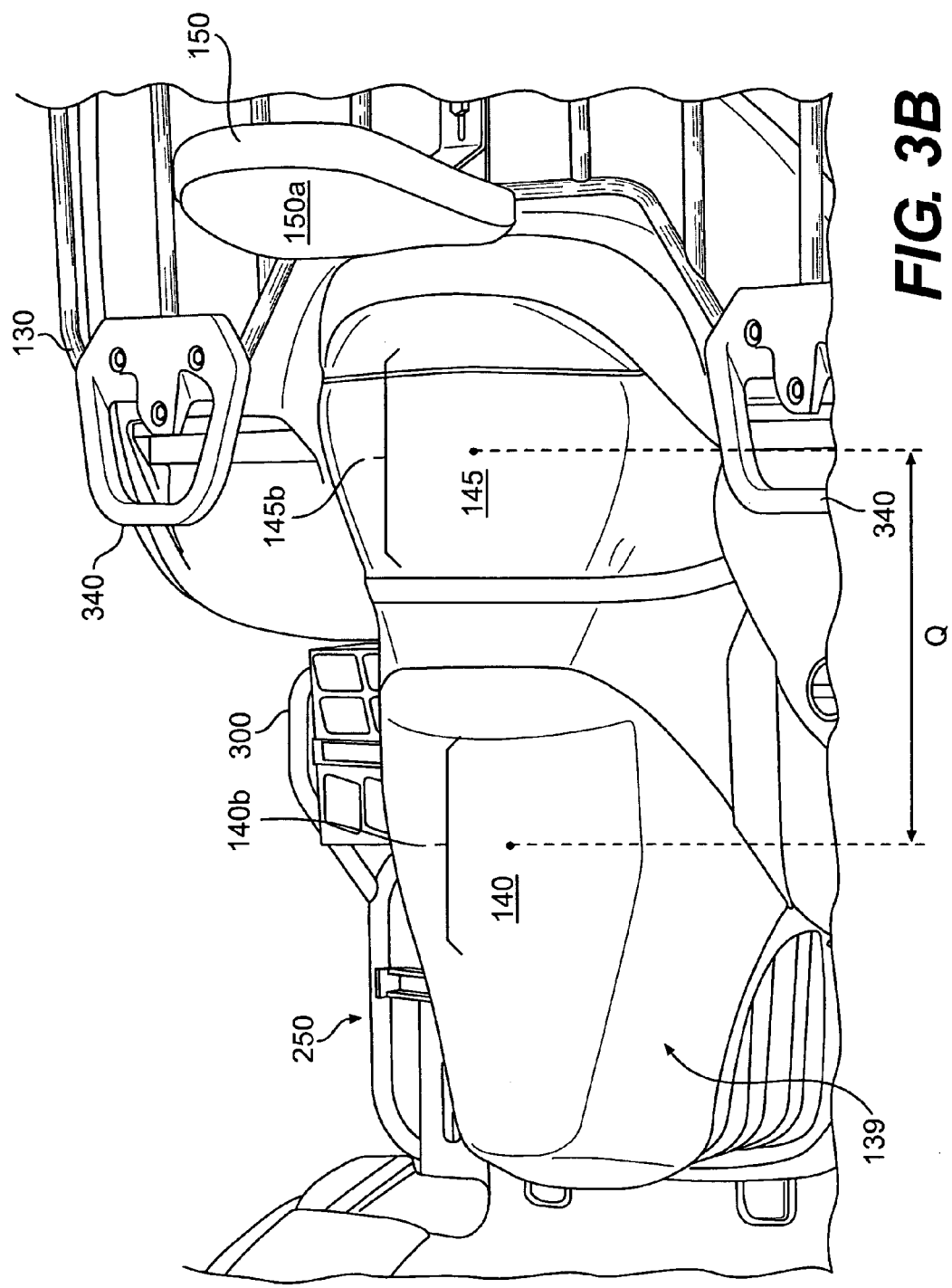
FIG. 3B is a top left partial perspective view of the seat of the ATV shown in FIG. 1.
Figure 3C:
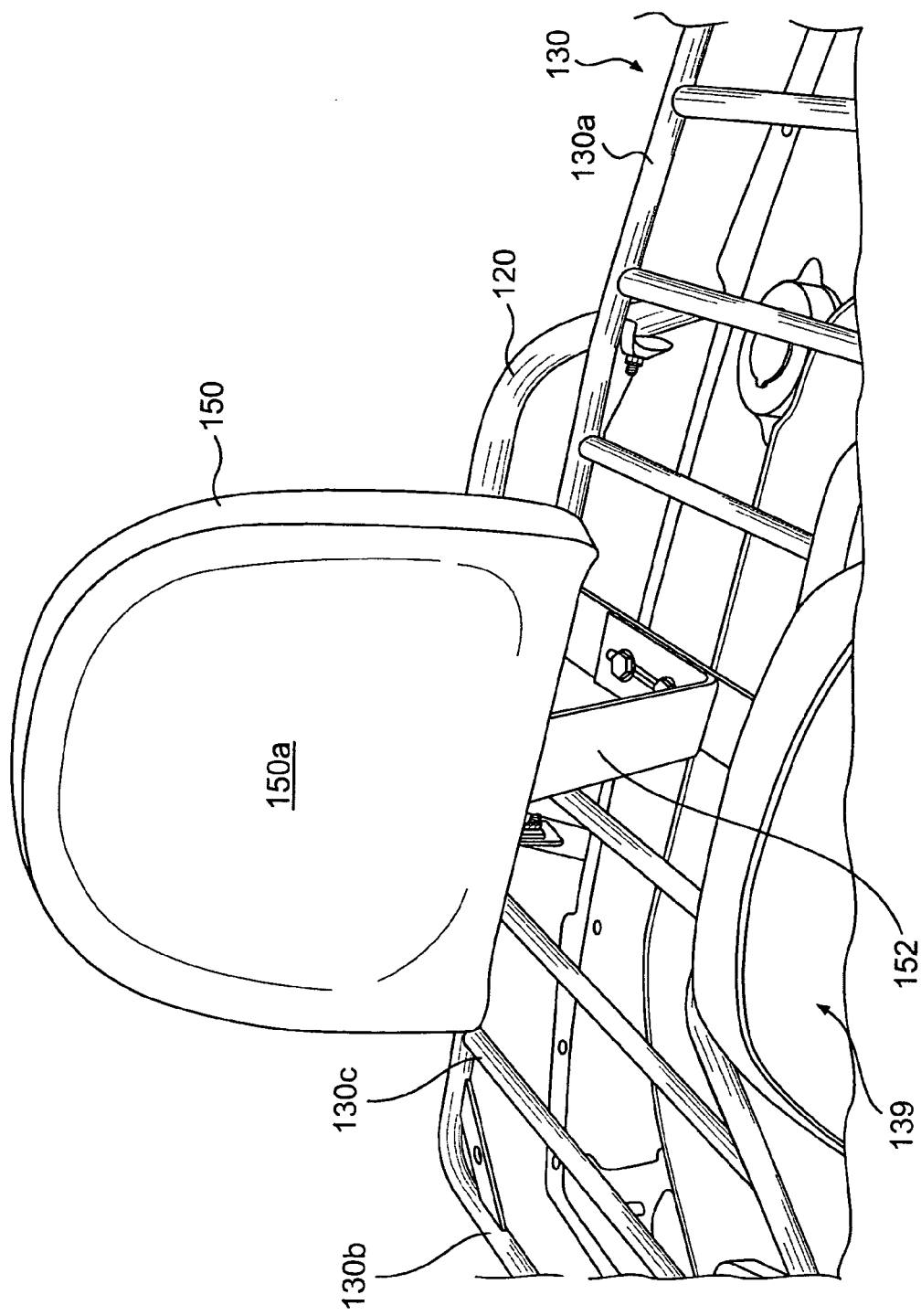
FIG. 3C is a forward left partial perspective view of a backrest of the ATV shown in FIG. 1.
Figure 3D:
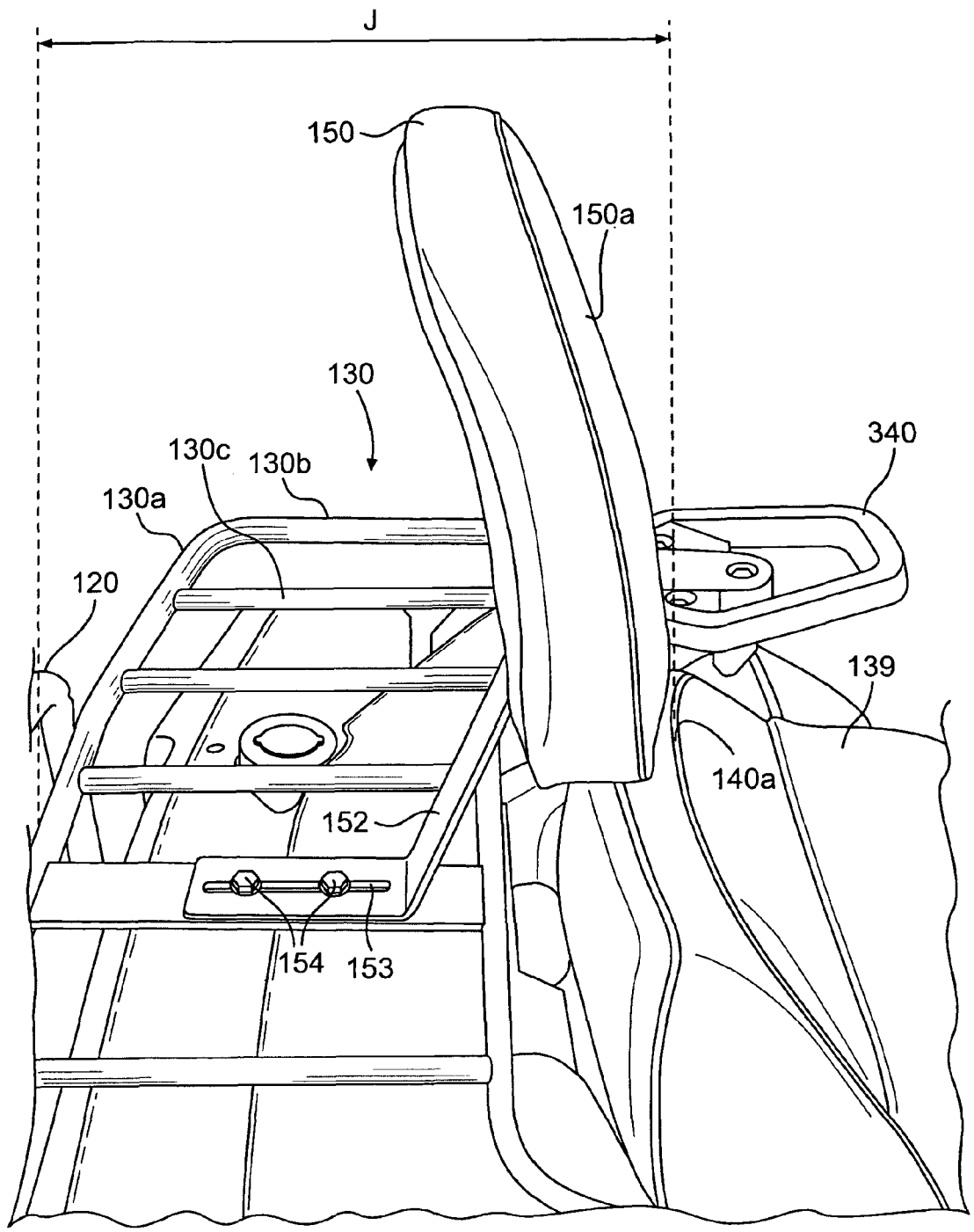
FIG. 3D is a right perspective view of the backrest of the ATV shown in FIG. 1.

As illustrated in FIG. 3D, the rearward end 140a of the seat and/or the forward surface 150a of the back rest 150 are preferably disposed in front of a majority of the rear rack 130 so that they do not interfere substantially with an open storage space provided on top of the rear rack 130. Accordingly, the rearward end 140a and the forward surface 150a are preferably disposed in front of a back side 130a of the rear rack by a horizontal distance J, which is preferably between 5 and 20 inches, is more preferably between 8 and 20 inches, is even more preferably between 10 and 20 inches, and is even more preferably between 14 and 20 inches. Because the back side 130a of the rear rack is generally longitudinally aligned with a rear end of the ATV 100 as a whole, the rearward end 140a and the forward surface 150a bear the same or similar relationship to the rear end of the ATV 100 as they do to the back side 130a of the rear rack 130.

The main seat portion 140 accommodates a standard driver in a standard driving position while the ATV 100 is headed straight forward (i.e., to the left as illustrated in FIG. 1) on flat terrain. The main portion 140 is positioned behind the front wheel axis 105 by approximately the same longitudinal extent as a conventional rider seat on a conventional ATV.

Figure 8:
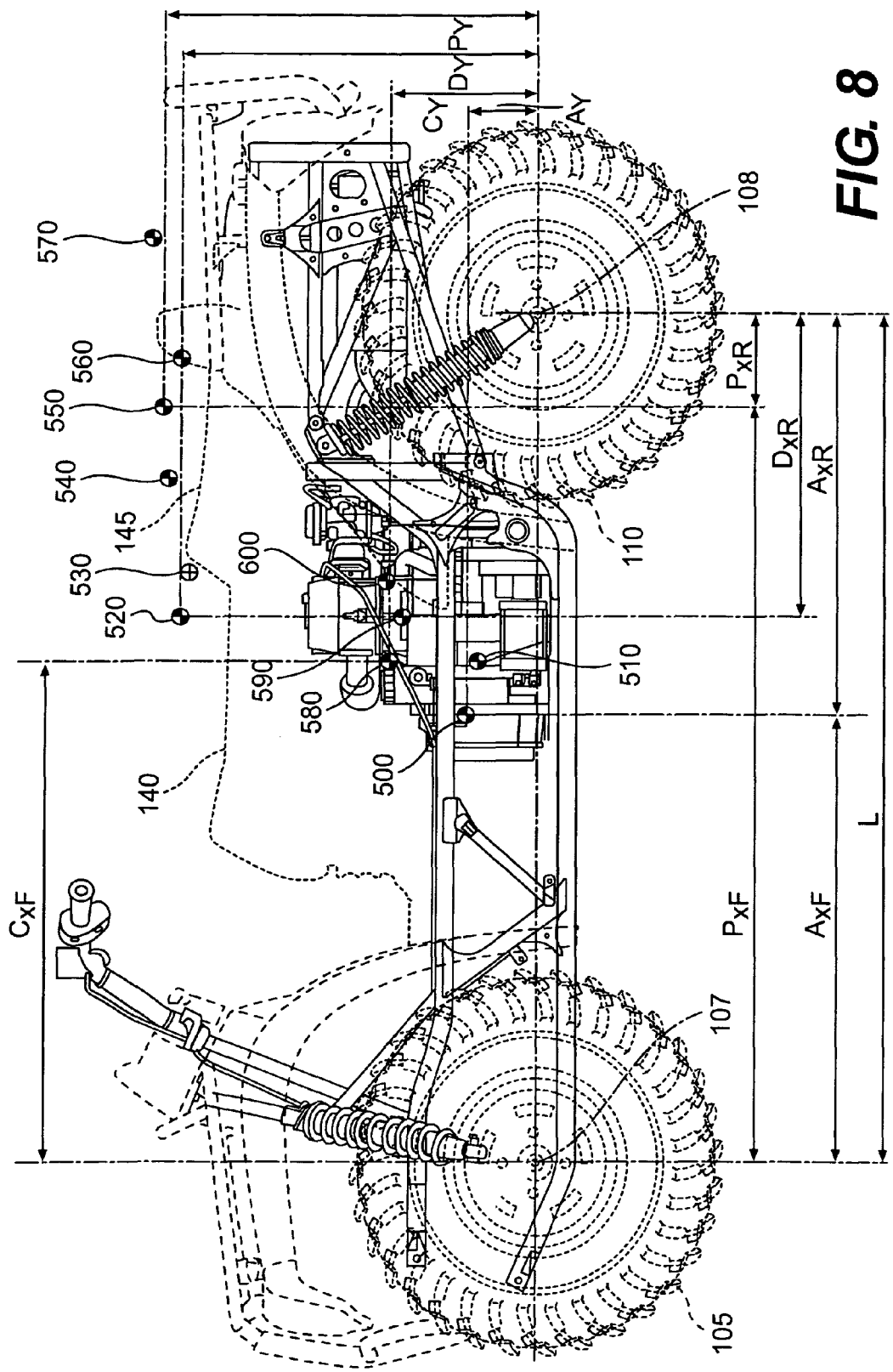
FIG. 8 is a side view of the ATV shown in FIG. 1 with comparative centers of gravity of various components of the ATV shown in FIG. 1 and of the conventional ATVs shown in FIGS. 11A–12B.

As illustrated in FIGS. 1 and 3B, the main seat portion 140 includes a main supporting range 140b, which is defined on the upper surface of the main seat portion 140 by a range of positions of a center of the weight distribution on the main seat portion 140 of a driver who is sitting on the main seat portion 140 in an operating position. Accordingly, a center of the main supporting range is preferably longitudinally disposed at the same point as the center of gravity 520 of the driver (as shown in FIG. 8 and described in greater detail below). Of course, they could be different, if desired and depending on the layout of the other components of the ATV 100 such as the engine 215. The main supporting range 140b is generally centered at a lateral center of the main seat portion 140 two thirds of the way back on the main seat portion 140 from the forward end 140a (i.e. positioned behind the forward end 140a by two thirds of the longitudinal length of the main seat portion 140, which is defined generally as a distance M between the forward end 140a and the uppermost edge of the transition/rear end 142 of the main seat portion 140). However, if the main seat portion 140 were shaped differently, the main supporting range may be located at a different relative position on the main seat portion 140. The main supporting range 140b preferably extends forwardly and rearwardly from its center by about 5 inches.

The center of the main supporting range 140b is disposed longitudinally rearwardly from the front wheel axis 107 by a distance T, which is preferably about 40–80% of the wheelbase L, is more preferably about 45–70% of the wheelbase L, and is even more preferably about 55–65% of the wheelbase L. Conversely, the center of the main supporting range 140b is disposed in front of the rear wheel axis 108 by a distance that is preferably about 20–60% of the wheelbase L, is more preferably about 30–55% of the wheelbase L, and is even more preferably about 35–45% of the wheelbase L. In absolute terms, the center of the main supporting range 140b is positioned in front of the rear wheel axis 108 by a distance L minus T, which is preferably between 21 and 30 inches, and is more preferably about 21.6 inches. In an alternative embodiment, distance L minus T is preferably about 22–30 inches, and is more preferably about 24–27 inches.

As illustrated in FIG. 8 and discussed in greater detail below, the position of the main seat portion 140 places the driver closer to the center of the wheelbase L than in conventional ATVs. Positioning the driver close to the center of the wheelbase L of the ATV 100 advantageously improves the driver's comfort. This positioning may also improve the handling of the ATV 100 due to the driver's active positioning.

The secondary portion 145 is designed to accommodate a passenger in a standard riding position. A secondary supporting range 145b is disposed on the secondary seat portion 145 and is defined in the same manner as the main supporting range 140a. A longitudinal length N of the secondary seat portion 145 is preferably 5% to 45% shorter than the length M of the main seat portion 140, but could alternatively be the same as the length M or even longer than the length M.

As illustrated in FIGS. 1–3D, a back rest 150 is provided behind the secondary portion 145 to help support the back of the passenger. The back rest 150 also deters additional unauthorized passengers from riding the ATV 100. The back rest 150 mounts on a post 152 that attaches to the rear rack 130 or directly to the frame 102. As shown in FIG. 3D for the illustrated embodiment, the post 152 is bent at its lower end and includes a slot 153 through which a plurality of bolts 154 extend to attach the post 152 to the rear rack 130. The slot 153 allows the longitudinal position of the back rest 150 to be adjusted. However, other longitudinal adjustment mechanisms may alternatively be used. Although not shown, the back rest 150 is adapted to accommodate a standard sized passenger, but may also be vertically adjustable to accommodate different sized passengers.

The post 152 (or some other part) of the backrest 150 is preferably designed such that the backrest 150 may deflect forwardly and rearwardly by several inches (e.g., 3 to 4 inches) during normal operation when subjected to a longitudinal load. This deflection enables the backrest 150 to more comfortably accommodate the passenger's back. The post 152 may comprise a resilient material such as spring steel that creates the desired flexibility.

Figure 10:
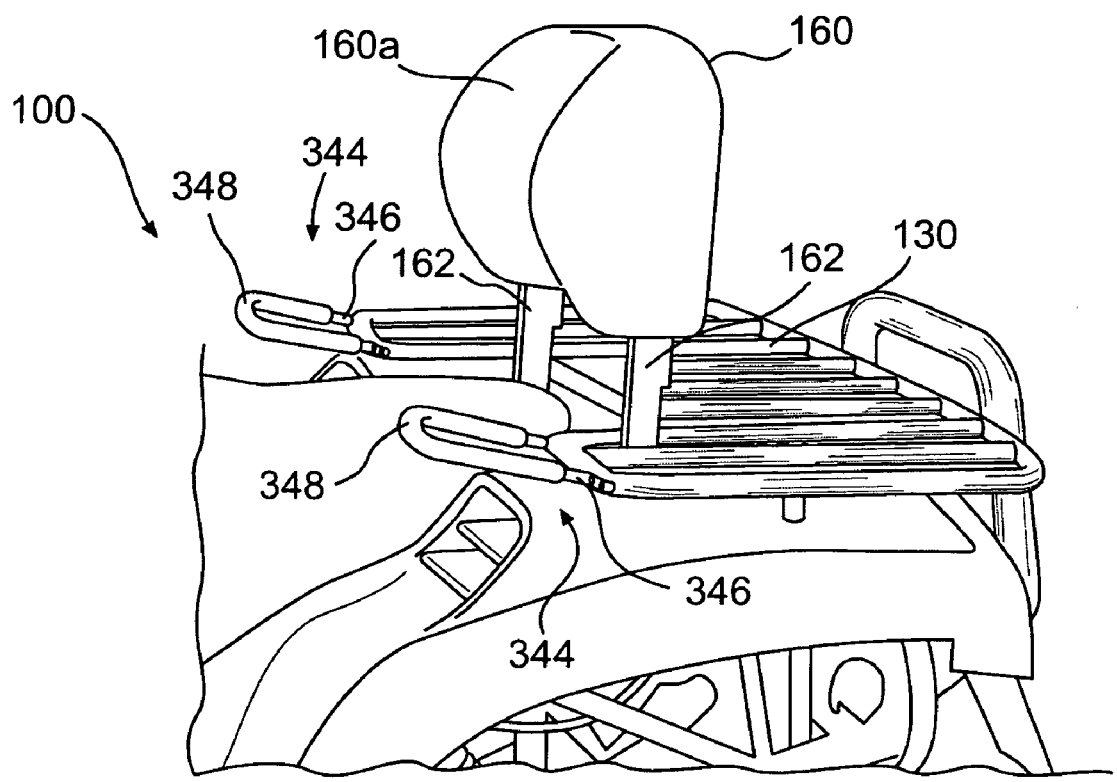
FIG. 10 is a partial perspective view of the ATV of FIG. 1 with a back rest and grab handles according to an alternative embodiment of the present invention.

While the illustrated back rest 150 utilizes just one centrally-positioned support post 152, the back rest could be attached to the ATV 100 in a variety of other manners as well. For example, FIG. 10 illustrates an alternative back rest 160 that may mount onto the ATV 100 instead of the back rest 150. The back rest 160 is mounted to the ATV 100 via two laterally-spaced support posts 162 that extend between opposite lateral sides of the back rest 160 and a structural portion of the ATV 100 such as the frame 102 or the rear rack 130. As illustrated in FIG. 10, a forward back-supporting surface 160a of the back rest 160 arches rearwardly in its middle portion such that a middle of the surface 160a is disposed rearwardly of the lateral sides of the surface 160a.

A back-supporting forward surface 150a is adapted to support and rest against a back of the passenger. The forward surface 150a is preferably disposed in front of the axis 108 of the rear wheels 110 by a distance B. However, the forward surface 150a could alternatively be disposed behind the rear axis 108 if other components are moved, the danger of rollover is minimized, and/or the dynamic handling of the ATV is not significantly adversely affected. The distance B is preferably greater than zero, is more preferably between ½ and 10 inches, and is even more preferably between about ½ and 3 inches. Alternatively, the distance B may preferably be between about 1 and 10 inches, and more preferably between about 1 and 3 inches. Similarly, the forward surface 150a is preferably disposed in front of a majority of, if not all of, the rear rack 130. Accordingly, the back rest 150 does not significantly, if at all, interfere with the storage space above the rear rack 130 (i.e., the rear rack 130 is usable even when the back rest 150 is attached to the ATV 100). Furthermore, the forward surface 150a is preferably disposed at generally the same longitudinal position along the ATV 100 as a rearward end 145a of the secondary seat portion 145. Accordingly, the rearward end 145a of the secondary seat portion 145 and the forward surface 150a preferably bear the same or similar longitudinal relationships to the axis 108 and rear rack 130.

As shown in FIGS. 1 and 3B, a secondary supporting range 145b of the secondary seat portion 145 is disposed farther forward relative to the rear wheel axis 108 on the ATV 100 than the after-market passenger seat on conventional ATVs (as described above), which are disposed behind the driver's seat. Accordingly, as illustrated in FIG. 8 and discussed in greater detail below, a passenger on the secondary seat portion 145 of the ATV 100 is positioned closer to the center of gravity 500 of the ATV 100 than passengers on conventional aftermarket passenger seats of conventional ATVs. Placing the passenger closer to the center of the wheelbase L of the ATV 100 improves the passenger's comfort and reduces the risk of roll-over. Furthermore, because the forward positioning of the secondary seat portion 145 places the center of gravity 550 of the passenger between the front and rear wheel axes 107, 108, the passenger's weight is more evenly distributed over the wheelbase L of the ATV 100 than in conventional aftermarket passenger seats, where a center of gravity 570 of a passenger might disadvantageously be positioned behind the rear wheel axis 108.

The secondary seat portion 145 should be disposed high enough above the rear wheel axis 108 that it does not interfere with the rear wheels 110 and/or rear fenders 137. Accordingly, the secondary seating range 145b of the secondary seat portion 145 is preferably disposed higher than the rear wheel axis 108 by a distance R. (see FIG. 1). The distance R is preferably between 20 and 35 inches, and is more preferably about 25 inches. In an exemplary embodiment, if the wheels 105, 110 have 26 inch diameters and the distance R is 25 inches, the secondary seat portion 145 would be disposed above the ground by about 38 inches.

The secondary seat portion 145 is disposed lower on the ATV 100 than conventional aftermarket passenger seats on conventional ATVs. The lower positioning is possible because the secondary seat portion 145 is disposed in front of the rear rack 130 and/or rear wheels 110, instead of directly over the rear wheels or even behind the rear wheels as in the prior art. Accordingly, the rear wheels 110 and rear fenders 137 interfere less with the secondary seat portion 145 than the rear wheels and fender of a conventional ATV interfere with conventional aftermarket passenger seats. As illustrated in FIG. 8 and discussed in greater detail below, because the secondary seat portion 145 is lower than conventional aftermarket passenger seats, the center of gravity 550 of a passenger on the secondary seat portion 145 of the ATV 100 is lower than the center of gravity 570 of a passenger on a prior art passenger seat. Lowering the passenger's center of gravity 550 advantageously improves the passenger's comfort, as well as the performance of the ATV 100.

The main supporting range 140b is disposed below the secondary supporting range 145b by a vertical height H. The height H is preferably between 0 and 8 inches, is more preferably between 1 and 4 inches, and is even more preferably about 2 inches. While the height H is preferably greater than 1 inch, the height H should be limited. If the height H is too large, the passenger's knees may interfere with the elbows of the driver and inhibit the driver's ability to steer the ATV 100. To avoid this problem, the height H is preferably less than 8 inches and is more preferably less than 4 inches. The height H may alternatively be zero (or even negative) such that the main and supporting ranges 140b, 145b are disposed at approximately equal heights.

As illustrated in FIGS. 1 and 3B, the center of the main supporting range 140b is longitudinally spaced from the center of the secondary supporting range 145b by a distance Q, which is preferably about 8 to 20 inches, is more preferably about 12 to 17 inches. The distance Q provides adequate longitudinal space for both the driver and the passenger such that the riders to not significantly interfere with each other. The distance Q provides adequate longitudinal space for the riders to comfortably and actively position themselves.

As best illustrated in FIG. 3B, forward parts of both the main and secondary seat portions 140, 145 taper laterally inwardly as they progress forwardly. Consequently, the forward part of the secondary seat portion 145 is preferably narrower than a rearward part of the main seat portion 140. The wider rearward parts of the seat portions 140, 145 provide comfortable support for the riders while the narrower forward parts of the seat portions 140, 145 provide the riders with greater leg mobility that improves the riders' abilities to actively position themselves. For example, when making a left turn during operation of the ATV, it is advantageous for the riders to be able to actively position themselves by shifting their weight to the left to stabilize the ATV 100. In this situation, the inward taper of the forward parts of the right side of the seat portions 140, 145 enables the riders to better position themselves by comfortably angling their right legs to a greater extent.

Figure 6:
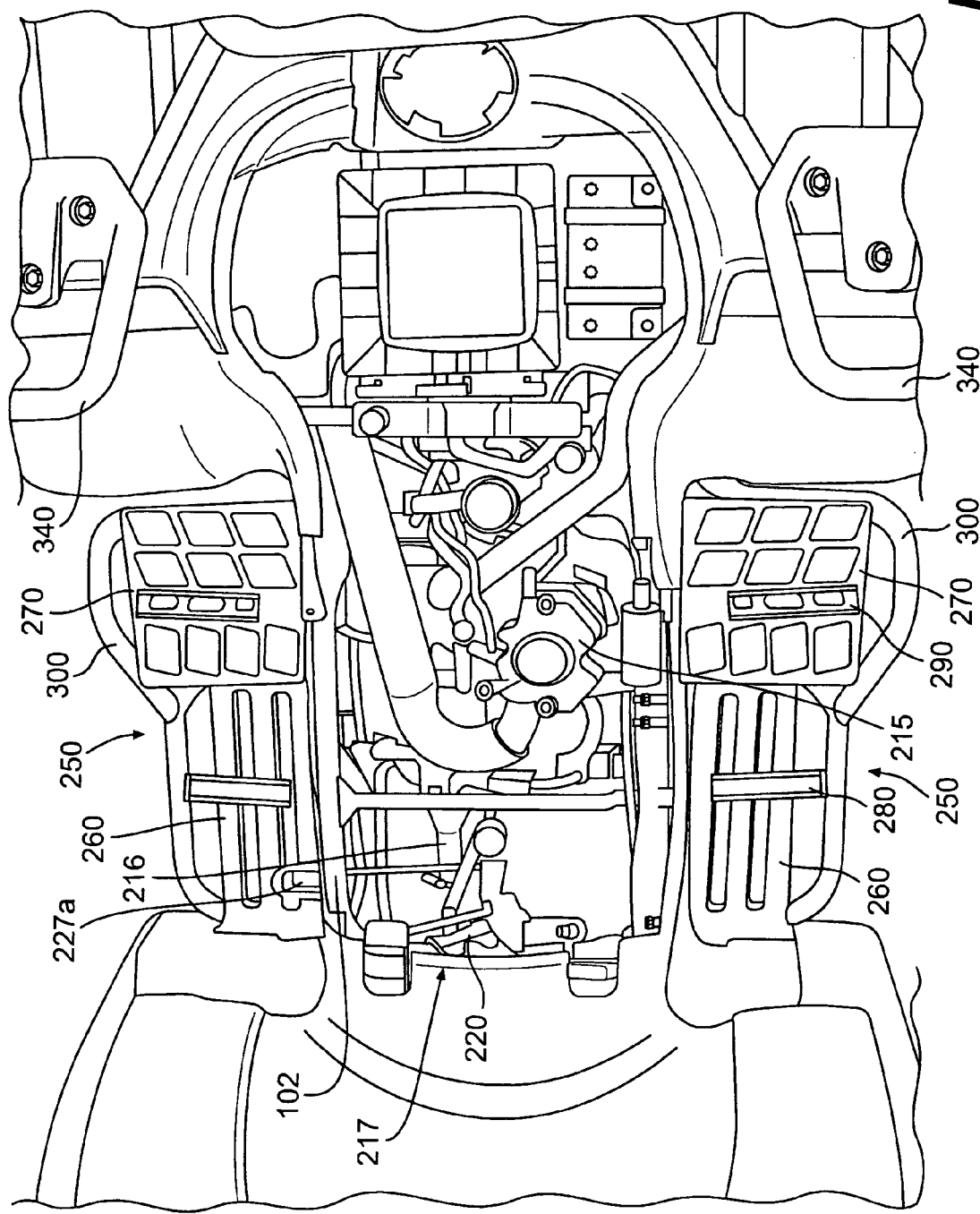
FIG. 6 is a partial top view of the ATV shown in FIG. 1 with the seat removed.

FIG. 6 is a partial top view of the ATV 100 with the seat 139 removed to expose the power unit 215, which in this embodiment comprises an internal combustion engine. The power unit 215 is operatively connected to at least one of the wheels 105, 110 via one or more driveshafts 216 to power the ATV 100. The power unit 215 is preferably operatively connected to all the wheels 105, 110.

To maximize the comfort of the ATV riders (driver and passenger) and improve the dynamic behavior of the vehicle 100, the center of gravity of the riders and vehicle 100 should be located properly. To achieve this maximum comfort, the riders (driver and passenger) should be located as close as possible to the center of the wheelbase L. This positioning enables the riders to naturally pivot between the front and rear wheels 105, 110 and experience as little jostling forces as possible during operation of the ATV 100. The comfort provided by such passenger positioning is best illustrated with reference to a school bus, which a person sitting in the back of the bus is far away from the bus's wheelbase center and experiences significant jostling as the bus pivots over bumps. Accordingly, the combined center of gravity of the vehicle, driver, and passenger should each be close to the center of the wheelbase L of the ATV 100 in order to obtain dynamic behavior that is as neutral as possible.

Figure 11A:
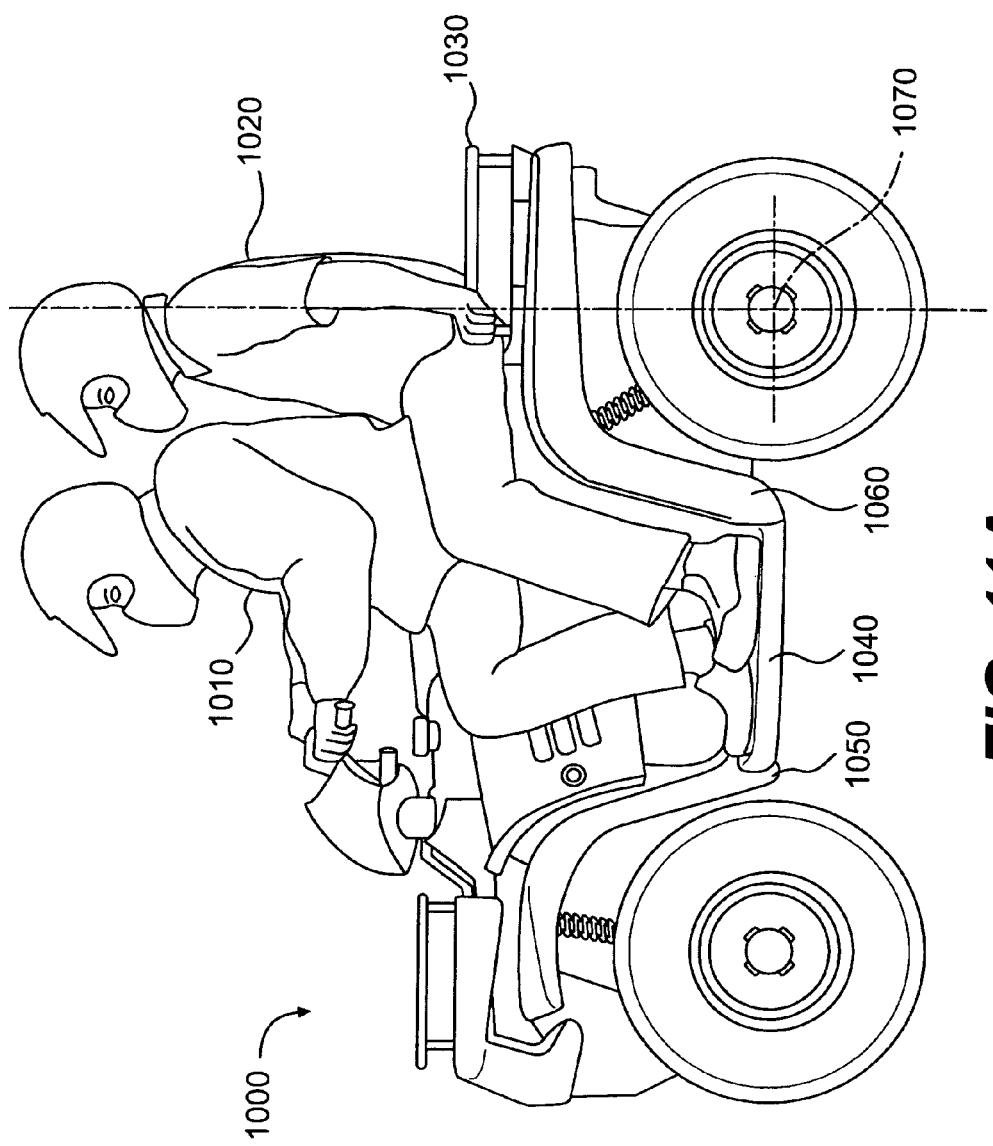
FIG. 11A is a left side view of two riders riding a conventional one-person ATV.
Figure 11B:
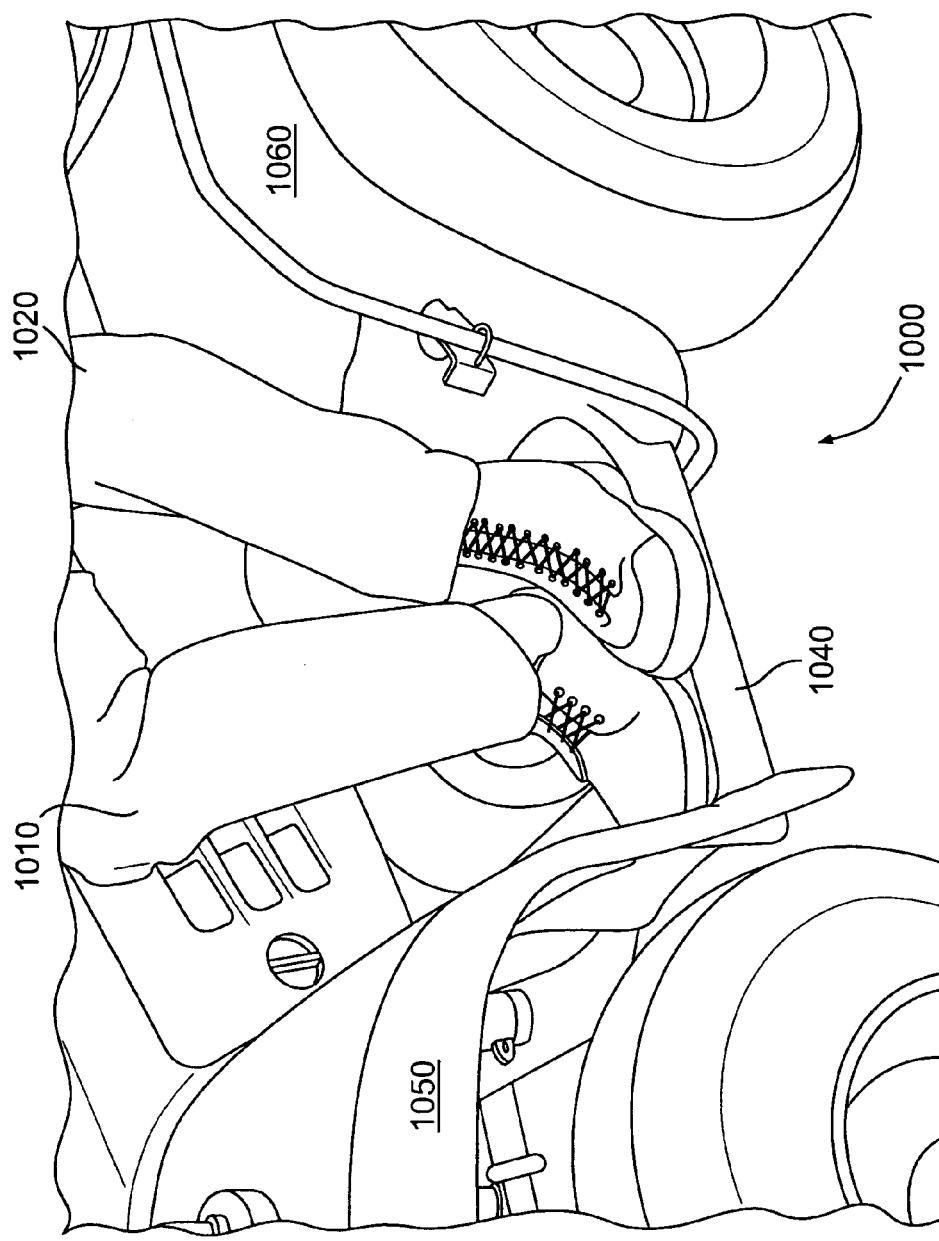
FIG. 11B is a forward left partial perspective view of the riders and ATV shown in FIG. 11A.
Figure 12A:
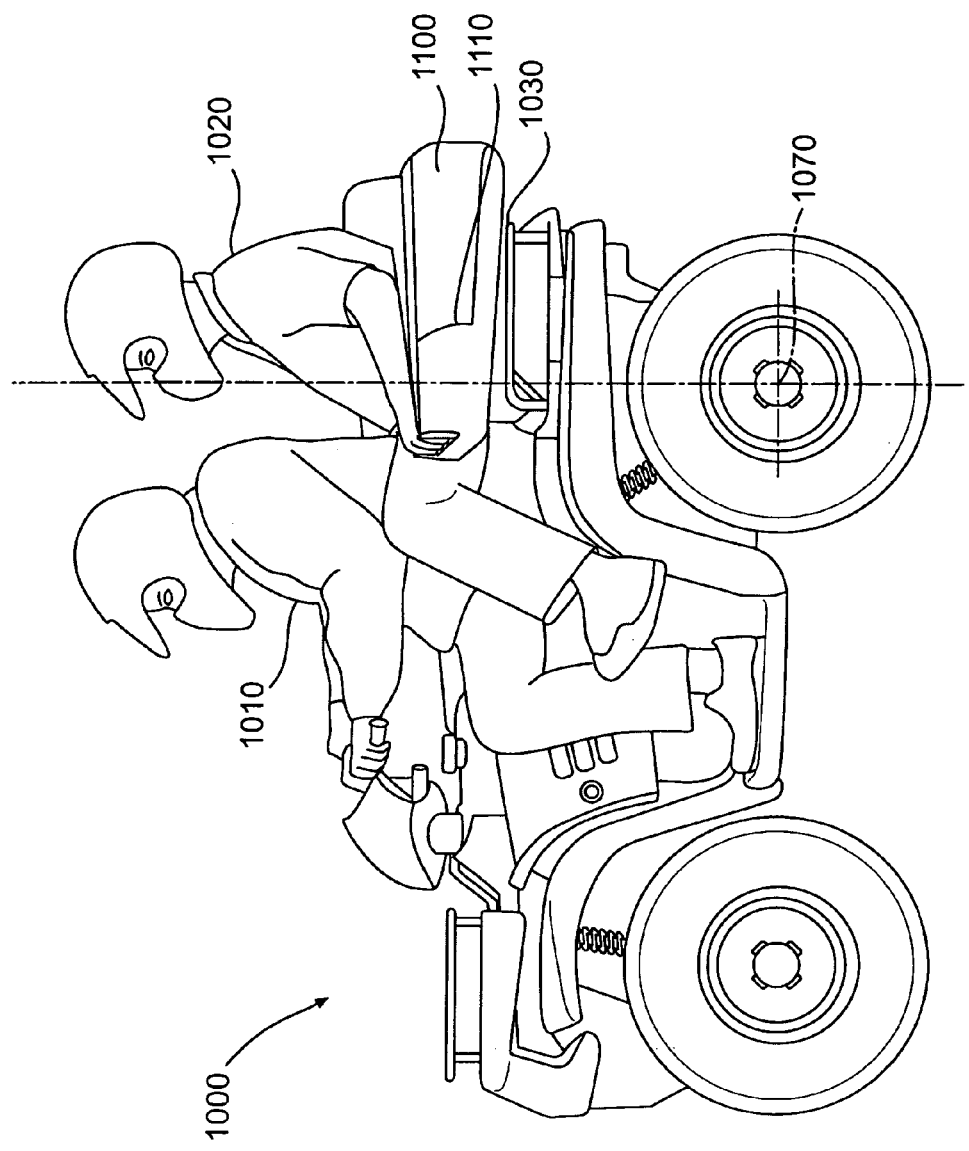
FIG. 12A is a left side view of two riders riding a conventional one-person ATV with an after market passenger seat attached thereto.
Figure 12B:
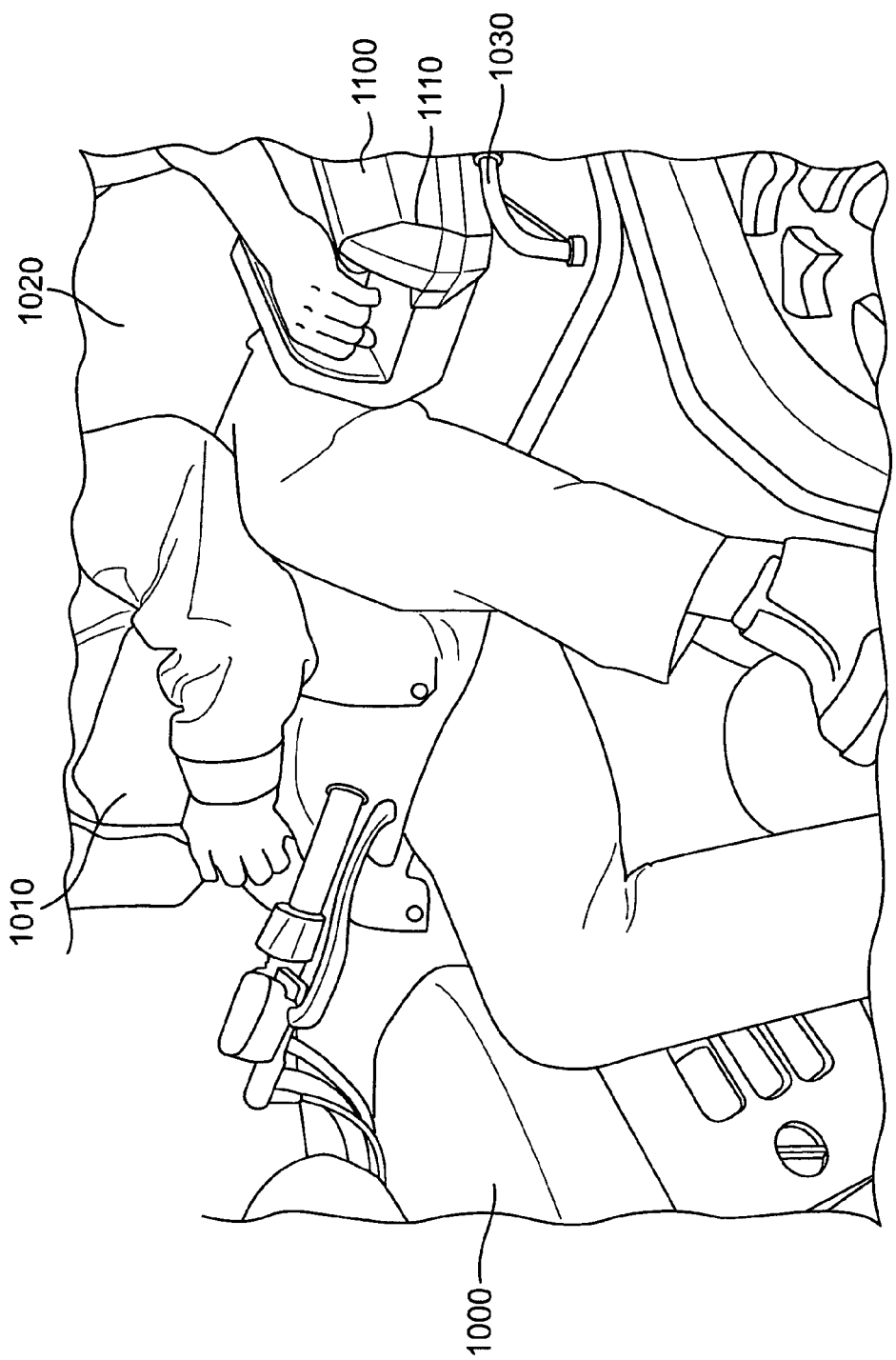
FIG. 12B is a forward left partial perspective view of the two riders and ATV shown in FIG. 12A.

FIG. 8 comparatively illustrates the centers of gravity of an exemplary ATV 100, driver, and passenger relative to the centers of gravity of (1) the conventional ATV 1000, its driver, and an unauthorized passenger (as shown in FIGS. 11A and 11B), and (2) the conventional ATV 1000, its driver, and a passenger sitting in the after market passenger seat 1100 (as shown in FIGS. 12A and 12B). All positions are shown relative to the rear axis of the relevant ATV 100, 1000. The exemplary ATV 100 is shown in phantom to provide perspective to the various positions. In the exemplary ATV 100 illustrated in FIG. 8, the wheelbase L is about 61 inches, the distance R is about 25 inches, the distance H is about 2 inches, the distance B is about ¾ of an inch, and the distance S is about 37 inches (see dimensions in FIG. 1).

As illustrated, an ATV 100 center of gravity 500 is horizontally disposed in front of the axis 108 by a distance $A_{xR}$, which is preferably between 26 and 35 inches, is more preferably between 27 and 34 inches, and is even more preferably about 29 inches. Conversely, a center of gravity 510 of the ATV 1000 is only disposed 25 inches in front of the rear wheel axis 1070 (see FIG. 11A).

In one embodiment of the present invention, a ratio of a horizontal distance $A_{xR}$ between the rear axis 108 and the center of gravity 500 of the ATV 100 to the distance L is preferably between 0.25 and 0.75, is more preferably between 0.4 and 0.6, and is even more preferably between about 0.45 and 0.55.

In an alternative embodiment of the present invention, a ratio of a horizontal distance $A_{xF}$ between the front axis 107 and the center of gravity 500 of the ATV 100 to the distance $A_{xR}$ (between the center of gravity 500 and the rear axis 108), which equals the distance L divided by the distance $A_{xR}$ minus one, is preferably between 1.05 and 2, is more preferably greater than 1.07, is even more preferably greater than 1.09, is even more preferably greater than 1.1, and is even more preferably about 1.12.

The center of gravity 500 is disposed above the rear wheel axis 108 by a distance $A_y$, which is preferably between about 0 and 10 inches, and is more preferably about 7 inches. In an alternative embodiment, the distance $A_y$ is about 5 inches.

Figure 9:
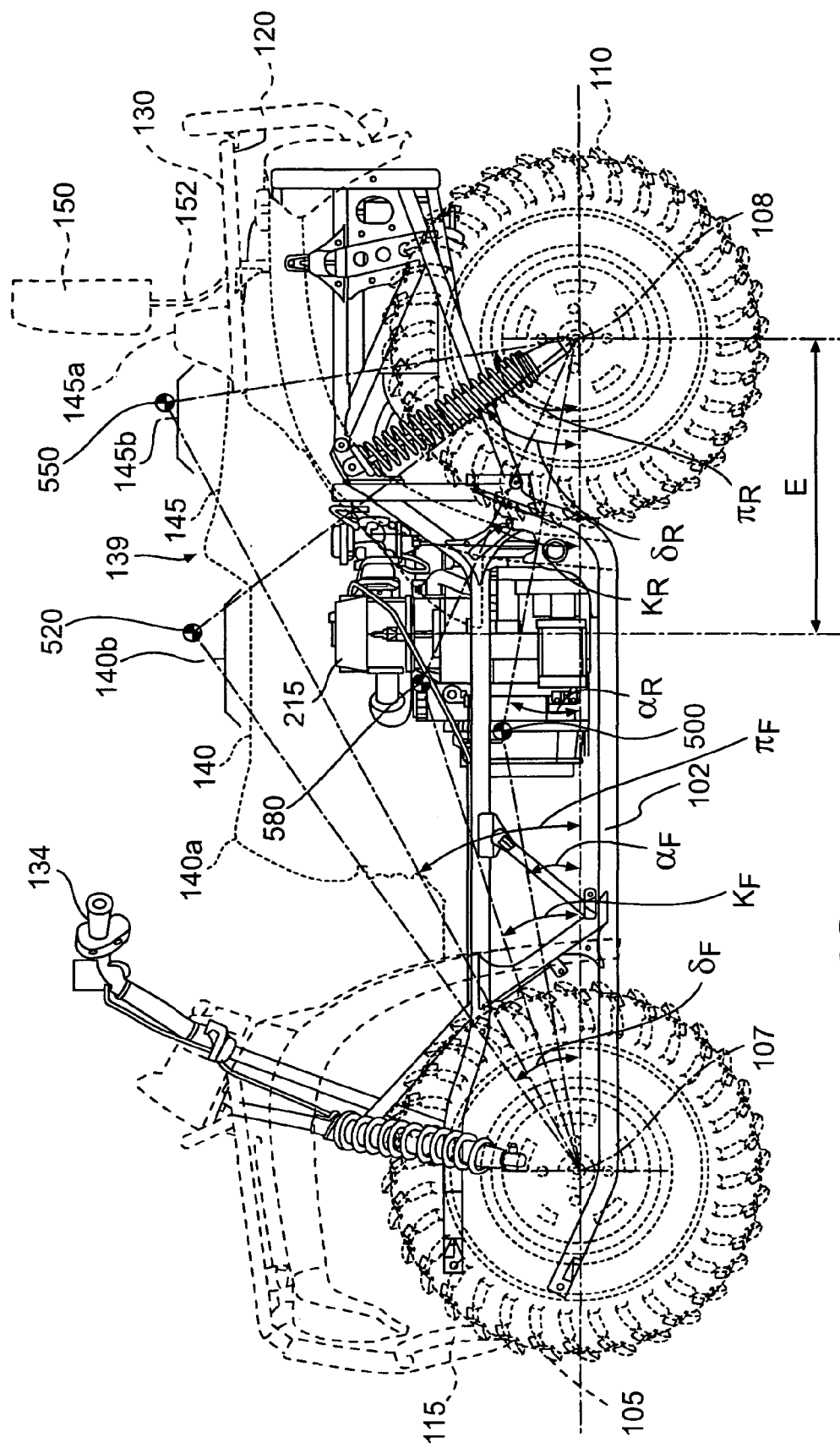
FIG. 9 is a partial cut away side view of the ATV shown in FIG. 1 illustrating the power unit.

As illustrated in FIG. 9, an angle $\alpha_R$ is formed between the front wheel axis 107, the rear wheel axis 108, and the center of gravity 500. Similarly, an angle $\alpha_F$ is formed between the rear wheel axis 108, the front wheel axis 107, and the center of gravity 500. The angles $\alpha_R$ and $\alpha_F$ are preferably less than 20 degrees and more preferably about 15 degrees. The angle $\alpha_R$ may alternatively be about 10 degrees. The angle $\alpha_F$ may alternatively be about 9 degrees. A line that forms the base of the angles $\alpha_R$, $\alpha_F$ and extends between the front and rear axes 107, 108 is preferably generally level because the front and rear wheels 105, 110 are preferably generally equally sized. In one embodiment, the front wheel 105 has a 25 inch diameter while the rear wheel 110 has a 26 inch diameter.

As illustrated in FIG. 8, a center of gravity 520 of the driver sitting on the main seat portion 140 of the ATV 100 is horizontally disposed in front of the axis 108 by a distance $D_{xR}$, which is preferably between 13 and 30 inches, is more preferably between 15 and 30 inches, is even more preferably between 19 and 30 inches, and is even more preferably about 22 inches. Conversely, the driver on the ATV 1000 without a passenger seat 1100, who is squished forwardly to provide space for the passenger 1020 as shown in FIG. 11A, has a center of gravity 530 that is only disposed about 19 inches in front of the rear wheel axis 1070. Similarly a center of gravity 540 of the driver on the ATV 1000 with the passenger seat 1100 (as shown in FIG. 12A) is only disposed about 12 inches in front of the axis 1070. Accordingly, FIG. 8 illustrates that the elongation of the frame 102 and wheelbase L of the ATV 100 enable the driver on the ATV 100 to be positioned farther in front of the rear wheel axis 108 than on conventional ATVs.

The center of gravity 520 is disposed above the rear wheel axis 108 by a distance $D_y$, which is preferably between about 10 and 35 inches, is more preferably between 15 and 35 inches, and is even more preferably about 22 inches.

As illustrated in FIG. 9, an angle $\delta_R$ is formed between the front wheel axis 107, the rear wheel axis 108, and the center of gravity 520. An angle $\delta_F$ is formed between the rear wheel axis 108, the front wheel axis 107, and the center of gravity 520. The angles $\delta_R$ and $\delta_F$ are preferably between 30 and 60 degrees, are more preferably between 30 and 51 degrees, and are even more preferably about 45 degrees. In an alternative embodiment, the angle $\delta_F$ is preferably between 15 and 45 degrees, is more preferably between 15 and 33 degrees, and is even more preferably about 32 degrees.

A center of gravity 550 of the passenger sitting on the secondary seat portion 145 of the ATV 100 is horizontally disposed in front of the rear axis 108 by a distance $P_{xR}$, which is preferably greater than zero, is more preferably between 1 and 19 inches, is even more preferably between 4 and 15 inches, and is even more preferably about 7 inches. Conversely, a center of gravity 560 of the unauthorized passenger on the ATV 1000 without the passenger seat (as shown in FIG. 11A) is only disposed about 4 inches in front of the rear axis 1070. A center of gravity 570 of the passenger on the passenger seat 1100 (as shown in FIG. 12A) is actually disposed behind the rear axis 1070 by about 6 inches. Accordingly, FIG. 8 illustrates that the elongation of the frame 102 and wheelbase L and the positioning of the secondary seat portion 145 enable the passenger on the ATV 100 to be disposed farther forward on the ATV 100 than on conventional ATVs. Such positioning improves the stability and comfort of the passenger on the ATV 100.

A ratio of a distance $P_{xF}$ between the front axis 107 and the center of gravity 550 of the passenger on the ATV 100 to the distance $P_{xR}$ (between the center of gravity 550 and the rear axis 108), which equals the distance L divided by the distance $P_{xR}$ minus one, is preferably between 2 and 13, is more preferably between 2 and 11, is even more preferably between 2 and 9, and is even more preferably about 8. Similarly, a ratio of the distance between the front axis 107 and center of the secondary supporting range 145b to the distance between the center of the secondary supporting range 145b and the rear axis 108 is preferably between 2 and 50, is more preferably between 2 and 40, is even more preferably between 2 and 30, and is even more preferably between 10 and 20.

The center of gravity 550 is disposed above the rear wheel axis 108 by a distance $P_y$, which is preferably between about 20 and 40 inches, and is more preferably about 27 inches.

As illustrated in FIG. 9, an angle $\pi_R$ is formed between the front wheel axis 107, the rear wheel axis 108, and the center of gravity 550. The angle $\pi_R$ is preferably between 60 and 90 degrees, is more preferably between 70 and 80 degrees, and is even more preferably about 76 degrees. An angle $\pi_F$ is formed between the rear wheel axis 108, the front wheel axis 107, and the center of gravity 550. The angle $\pi_F$ is preferably between 15 and 45 degrees, is more preferably between 15 and 30 degrees, and is even more preferably about 27 degrees.

When both a driver and a passenger ride the ATV 100, a combined center of gravity 580 of the ATV 100 and the two riders is horizontally disposed in front of the rear axis 108 by about 25 inches. Conversely, when two riders ride the ATV 1000 without a passenger seat 1100 (as shown in FIG. 11A), a combined center of gravity 590 is only disposed about 21 inches in front of the rear axis 1070. Similarly, when two riders ride the ATV 1000 with a passenger seat 1100 (as shown in FIG. 12A), a combined center of gravity 600 is only disposed about 19 inches in front of the rear axis 1070.

Similarly, the combined center of gravity 580 is preferably disposed rearwardly of the front axis 107 by a distance $C_{xF}$ that is preferably between 25 and 50 inches, is more preferably between 30 and 45 inches, is even more preferably between 33 and 45 inches, is even more preferably between 34 and 45 inches, and is even more preferably about 36 inches.

The combined center of gravity 580 is preferably disposed above the rear wheel axis 108 by a distance $C_y$, which is preferably between 5 and 20 inches, and is more preferably by about 11 inches.

As illustrated in FIG. 9, an angle $\kappa_R$ is formed between the front wheel axis 107, the rear wheel axis 108, and the combined center of gravity 580. The angle $\kappa_R$ is preferably between 15 and 45 degrees, is more preferably between 15 and 35 degrees, and is even more preferably about 30 degrees. In an alternative embodiment, the angle $\kappa_R$ is preferably between 15 and 30 degrees, is more preferably between 15 and 25 degrees, and is even more preferably about 24 degrees. An angle $\kappa_F$ is formed between the rear wheel axis 108, the front wheel axis 107, and the combined center of gravity 580. The angle $\kappa_F$ is preferably between 10 and 45 degrees, is more preferably between 10 and 30 degrees, is even more preferably between 15 and 30 degrees, and is even more preferably about 20 degrees. In an alternative embodiment, the angle $\kappa_F$ is preferably between 10 and 18 degrees, and is more preferably about 17 degrees.

As illustrated in FIGS. 1, 6, and 9, the power unit 215 is located in front of the rear wheel axis 108 by a distance E. The distance E is preferably about 22 to 40 inches and is more preferably about 24 to 38 inches. In an alternative embodiment, the distance E is preferably about 22–30 inches, and is more preferably about 24–27 inches. Because the power unit 215 is preferably disposed at generally the same longitudinal position on the ATV 100 as the main supporting range 140b, the distances E plus T equal the wheelbase L. However, such a relationship between the power unit 215 and the main supporting range 140b is not required. Furthermore, a ratio of the distance E to the distance L is preferably between 0.25 and 0.75 and is more preferably between 0.4 and 0.6.

Figure 13:
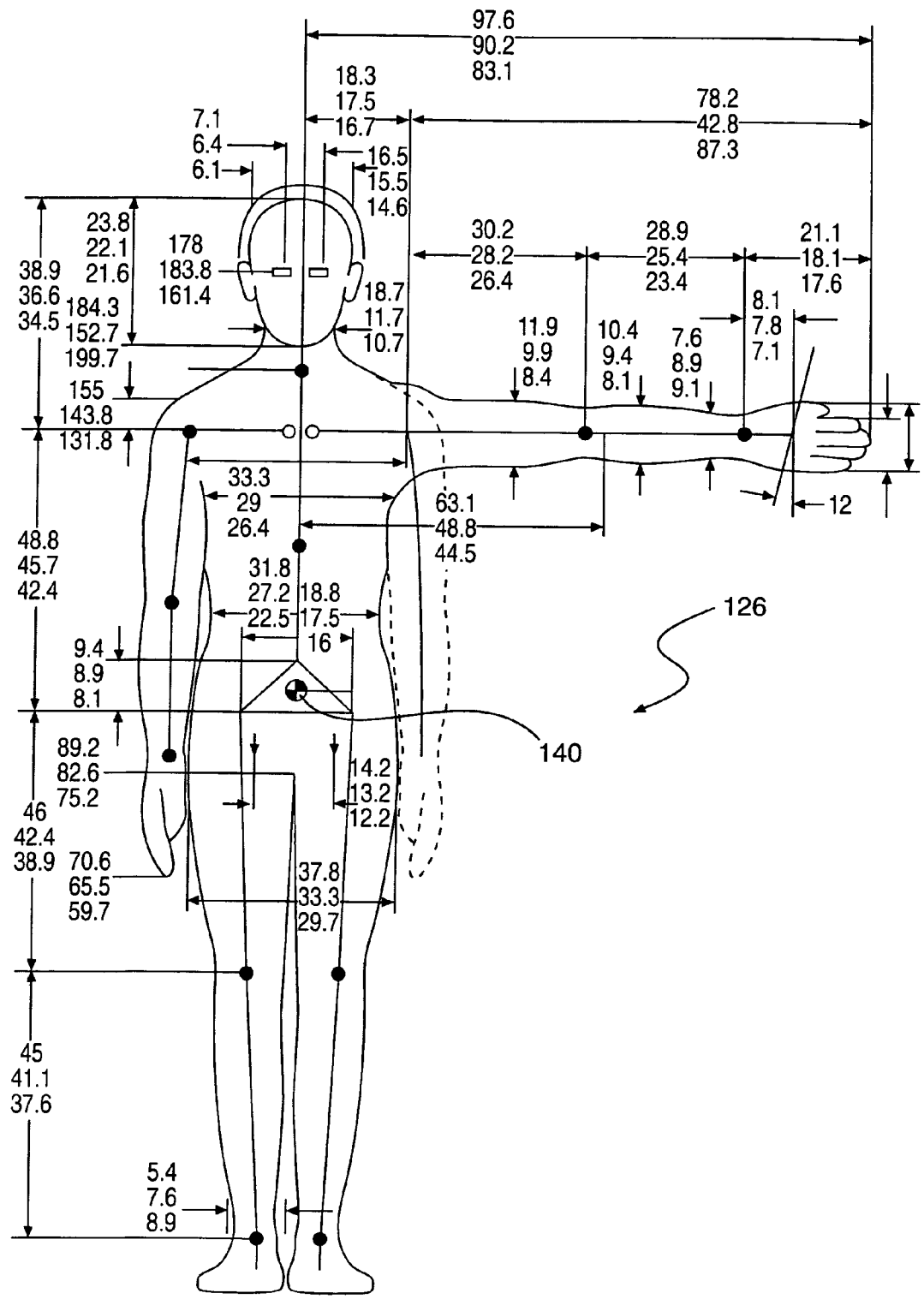
FIG. 13 illustrates a front elevational view of a standard rider.
Figure 14:
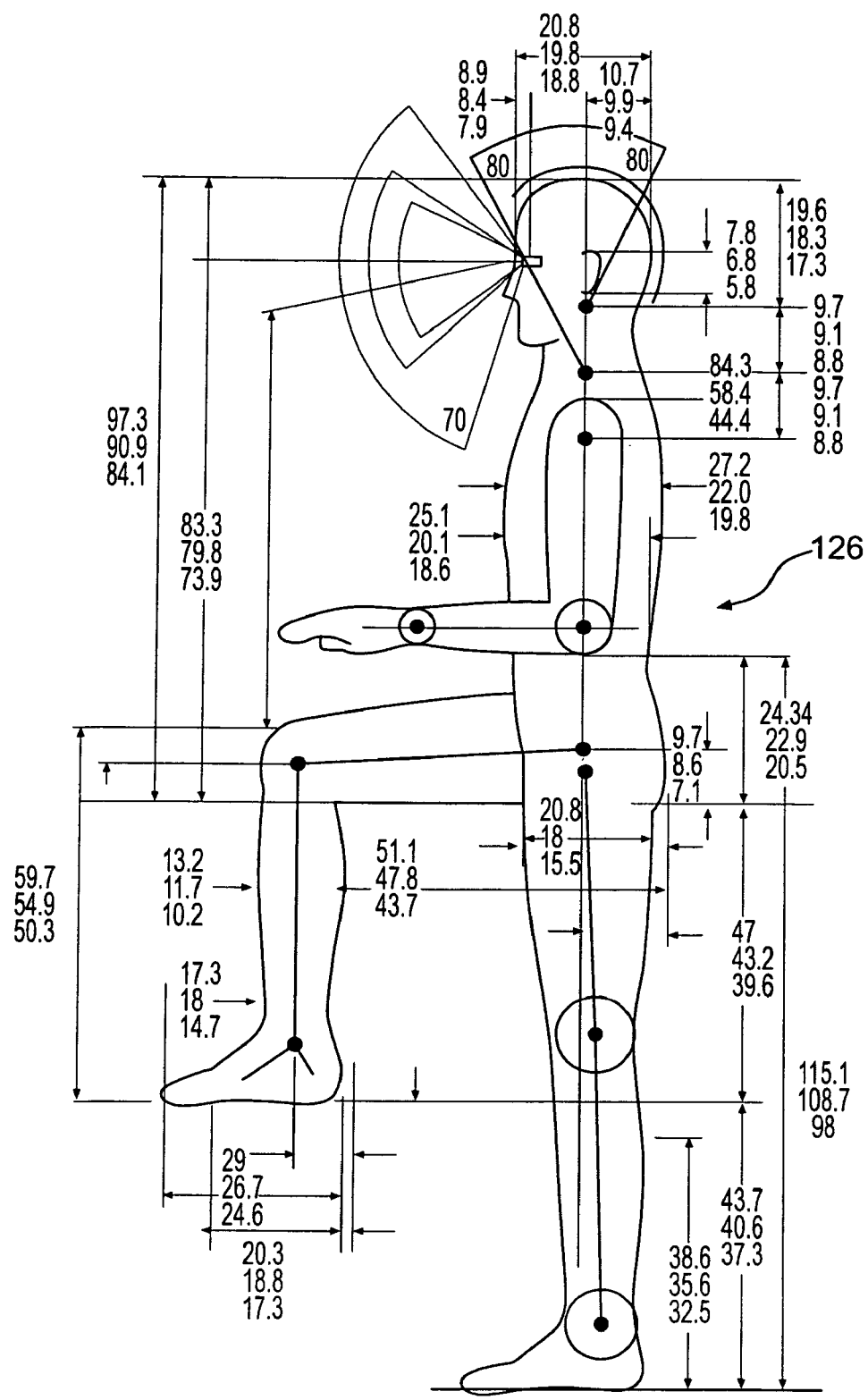
FIG. 14 illustrates a side elevational view of the standard rider illustrated in FIG. 13.

The centers of gravity of the riders are measured when the riders are seated on their respective seat portions in standard riding positions. As would be appreciated by those of ordinary skill in the art, when in a standard riding position, the driver's feet are placed on the footrests, the driver is sitting on the seat portion 140, and the driver's hands are grabbing the handlebars 134 of other steering device. Similarly, the passenger's feet are placed on the footrests, the passenger is sitting on the seat portion 145, and the passenger's hands are holding onto the passenger grab handles, if provided. The standard driver and passenger have the weight and dimensions of a $50^{th}$ percentile human male, which are illustrated in FIGS. 13 and 14.

Because the power unit 215, which is among the heaviest components on the ATV 100, is disposed in front of the rear axis 108 by the distance E, and the wheelbase L of the ATV 100 is longer than on conventional ATVs, the center of gravity 500 of the ATV 100 is shifted proportionally rearwardly relative to wheelbases of conventional ATVs. Accordingly, the center of gravity 500 of the ATV 100 is shifted rearwardly and is therefore closer to the main and secondary supporting ranges 140b, 145b (and consequently closer to the centers of gravity 520, 550 of the riders) than on conventional ATVs. Also, while the power unit is typically disposed in front of the driver seat in conventional ATVs, a forward end of the power unit 215 is preferably disposed longitudinally rearwardly from the forward end 140a of the main seat portion 140 of the ATV 100.

To optimize the comfort of the riders and the dynamic performance of the ATV 100, the combined center of gravity 580 should be as centered on the wheelbase L as possible. If the center of gravity of the vehicle 500 is centered on the wheelbase L, the center of gravity of the driver 520 and the passenger 550 should be as close to the center of the wheelbase L as possible. Because it is difficult to simultaneously center each of the driver, passenger, and ATV 100 on the wheelbase L, the ATV 100 should be designed so that the center the combined center of gravity 580 is positioned as close to the center of the wheelbase L as possible. It is anticipated that a single rider (the driver) will ride the ATV 100 about 70% of the time and two riders (the driver and the passenger) will ride the ATV about 30% of the time. Accordingly, the center of gravity 500 of the ATV 100 is preferably positioned such that when a combined center of gravity 580 is determined using a percentage-of-use-based weighted average of the positions and weights of the driver and passenger, the combined center of gravity 580 is positioned as close to the center of the wheelbase L as possible.

In an alternative embodiment of the present invention, the dynamic characteristics of the ATV 100 and comfort of the driver and passenger may be improved by positioning the center of gravity 500 of the ATV 100 as close as possible to the centers of gravity 520, 550 of the riders. To accomplish this, the center of gravity 500 of the ATV 100 could be moved part way between the centers of gravity 520, 550 of the driver and passenger with the exact placement of the center of gravity 500 being determined by the weighted average of the percentage of use of the ATV 100 in one-rider and two-rider modes. The main and secondary supporting ranges 140*b*, 145*b* are reasonably close to the longitudinal positions of the centers of gravity 520, 550 of the driver and passenger, respectively, when riding the ATV 100. Accordingly, the centers of the supporting ranges 140*b*, 145*b* will be used herein as reference points for describing the placement of the center of gravity 500 of the ATV 100. In other embodiments, the centers of gravity 520, 550 are disposed in front of the centers of the supporting ranges 140*b*, 145*b* by between about 2 and 5 inches. Similarly, the centers of gravity 520, 550 are disposed above the centers of the supporting ranges 140*b*, 145*b* by several inches (e.g., 4–6 inches).

In this alternative embodiment, the center of gravity 500 of the ATV 100 is preferably longitudinally positioned between the supporting ranges 140*b*, 145*b*, and is more preferably disposed rearwardly of the main supporting range 140*b* by about 30% of the distance Q between the centers of the supporting ranges 140*b*, 145*b*. The center of gravity of the ATV 100 is preferably disposed closer to the main supporting range 140*b* than to the secondary supporting range 145*b* because a driver rides the ATV 100 70% more often than a passenger. In this alternative embodiment, the power unit 215 may be shifted further rearward in order to shift the center of gravity 500 of the ATV 100 farther rearward.

In conventional ATVs, a hydraulic brake actuating system is typically provided rearwardly of the power unit. Such positioning is convenient because it is close enough to the footrest to conveniently provide a mechanical connection between a foot brake pedal and the hydraulic brake actuating system. Conversely, in the ATV 100, a front (or main) footrest portion 260 of a footrest 250 of the ATV 100, which is described in greater detail below, is disposed in front of the power unit 215, which places the front foot rest portion 260 well forward of the conventional position of the hydraulic brake actuating system.

Figure 7:
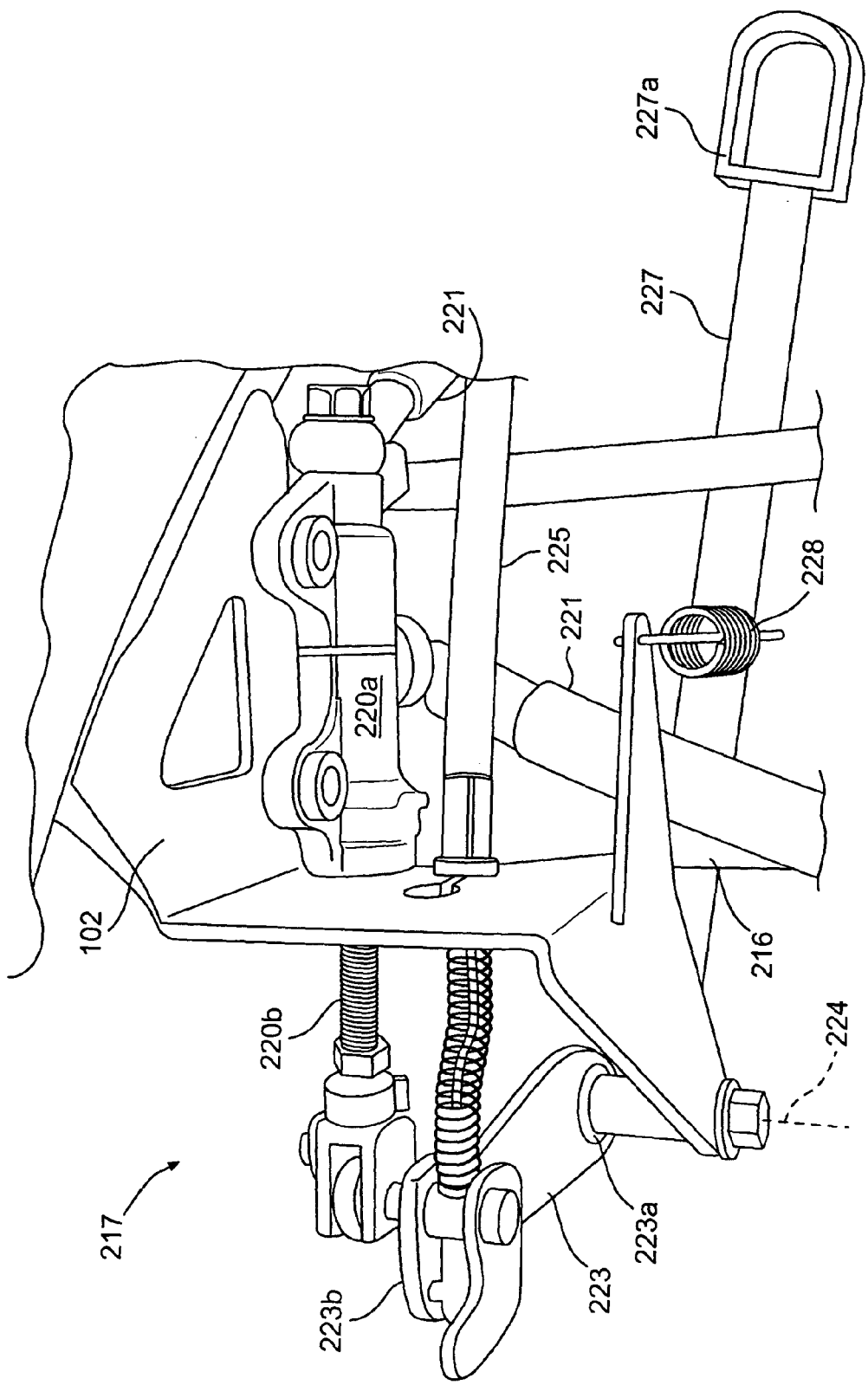
FIG. 7 is a partial perspective view taken from the top, rear side of the ATV shown in FIG. 1 with the seat removed.

Accordingly, to simplify the mechanical connection between the foot brake pedal and the hydraulic brake actuating system, a hydraulic brake actuating system 217 of the ATV 100 is disposed in front of the power unit 215 (see FIGS. 6 and 7). As best shown in FIG. 7, the system 217 includes a master cylinder 220 operatively connected via hydraulic lines 221 to conventional hydraulic brakes (not shown) that are connected to one or more of the wheels 105, 110. The master cylinder 220 includes mating cylinder and piston portions 220*a*, 220*b*. An axis of the master cylinder 220 extends in a direction that is generally perpendicular to the longitudinal direction of the ATV 100. As best seen in FIG. 6, the master cylinder 220 is angled slightly downwardly such that the piston portion 220*b* is disposed below the cylinder portion 220*a*. The cylinder portion 220*a* is mounted (via bolts or other fasteners) to a portion of the frame 102.

A swing arm 223 is also pivotably connected at a first end 223*a* to the frame 102 for relative pivotal movement about a swing arm axis 224 that extends in the longitudinal direction of the ATV 100. A second end 223*b* of the swing arm 223 is pivotably connected to the piston portion 220*b* such that pivotal movement of the swing arm 223 actuates the master cylinder 220. A hand brake lever 226 (see FIG. 1) is operatively connected to the second end 223*b* of the swing arm 223 via a flexible sheathed cable 225 (see FIG. 7). A laterally-extending foot brake 227 attaches (preferably via a weld) to the first end 223*a* of the swing arm 223 for common pivotal movement about the swing arm axis 224 relative to the frame 102. As illustrated in FIGS. 6 and 7, the foot brake 227 includes a foot pedal 227*a* that is conveniently disposed above a right, front portion 260 of a right footrest 250. A tension spring 228 connects between the foot brake 227 and a portion of the frame 102 to bias the foot brake 227 upwardly and thereby bias the second end 223*b* and piston portion 220*b* to the left as illustrated in FIG. 7.

As shown in FIG. 7, to actuate the brakes of the ATV 100, the driver can either squeeze the hand brake 226 or depress the foot pedal 227*a* to move the second end 223*b* of the swing arm 223 to the right, move the piston portion 220*b* to the right, and contract the master cylinder 220. When the driver releases the hand and foot brakes 226, 227, the spring 228 pulls the foot brake 227 upwardly, which pushes the second end 223*b* of the swing arm 223 back to the left to extend the master cylinder 220 and release the brakes.

As illustrated in FIG. 6, the longitudinal elongation of the frame 102 enables ATV 100 components such as the power unit 215, brake actuating system 217, batteries, etc. to be longitudinally spaced from each other to a greater extent than in conventional ATVs. In conventional ATVs, the lack of longitudinal space forces designers to stack ATV components into longitudinally cramped locations. Conversely, as is apparent in FIG. 6, the longitudinal elongation of ATV 100 allows components to be spread out over the longer length of the frame 102 of the ATV 100. The longitudinal spacing makes access to individual components such as the brake actuating system 217 (see FIGS. 6 and 7) much simpler. By simply removing the removable seat 139, which is removably connected to the ATV 100 using conventional fasteners (e.g., a latch, etc.), an operator can access many of the components of the ATV 100 for necessary maintenance and/or servicing. Otherwise, the space can be used for additional storage.

Each of the rear fenders 137 includes a series of ventilation openings 230 that direct air to the air intake of the power unit 215 and/or a radiator/fan assembly (not shown). Additional ventilation openings 235 are provided for the power unit 215 below the forward end 140*a* of the main seat portion 140*a*.

As illustrated in FIGS. 1, 3A, 5, and 6, the ATV 100 includes left and right footrests 250, which include front portions 260 for the driver sitting on the main seat portion 140 and rear portions 270 for the passenger sitting on the secondary seat portion 145. As illustrated in FIGS. 5A–5C, the front and rear portions 260, 270 preferably include upper surfaces 260*a*, 270*a* that are each generally horizontal and include anti-slip surface treatments. However, the upper surfaces 260a, 270a may alternatively be angled forwardly or rearwardly. The front and rear footrest portions 260, 270 preferably include respective heel stops 280, 290 that extend upwardly from the upper surfaces 260a, 270a.

The upper surface 270a of the rear footrest portion 270 is elevated relative to the upper surface 260a of the front footrest portion 260 by a vertical distance X, which preferably approximates the vertical distance H formed between the seat portions 140, 145. However, the distance X may alternatively be larger than the distance H such that an average sized passenger sitting on the secondary seat portion 145 must bend his/her legs to a greater extent than the driver who sits on the main seat portion 140. In such an embodiment, the distance X is preferably between 1 and 10 inches, is more preferably between 3 and 8 inches, is even more preferably between 3 and 7 inches, is even more preferably between 4 and 6 inches, and is even more preferably about 5 inches. The larger distance X also advantageously accommodates a passenger who is smaller than the driver.

Figure 5A:
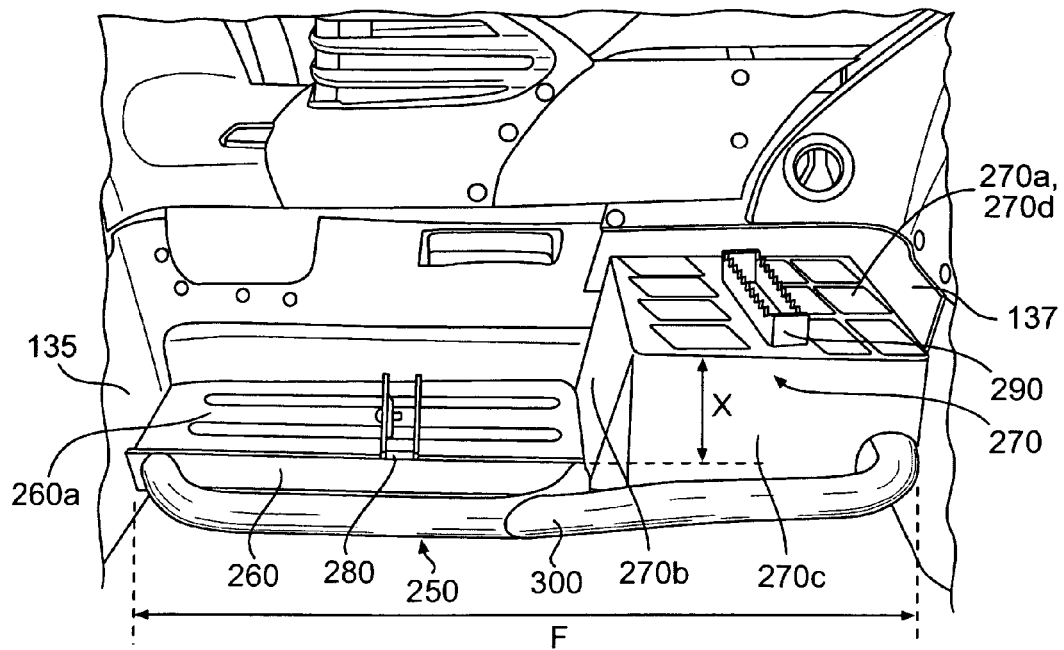
FIG. 5A is a partial perspective view of the top and side of a left footrest of the ATV shown in FIG. 1.
Figure 5B:
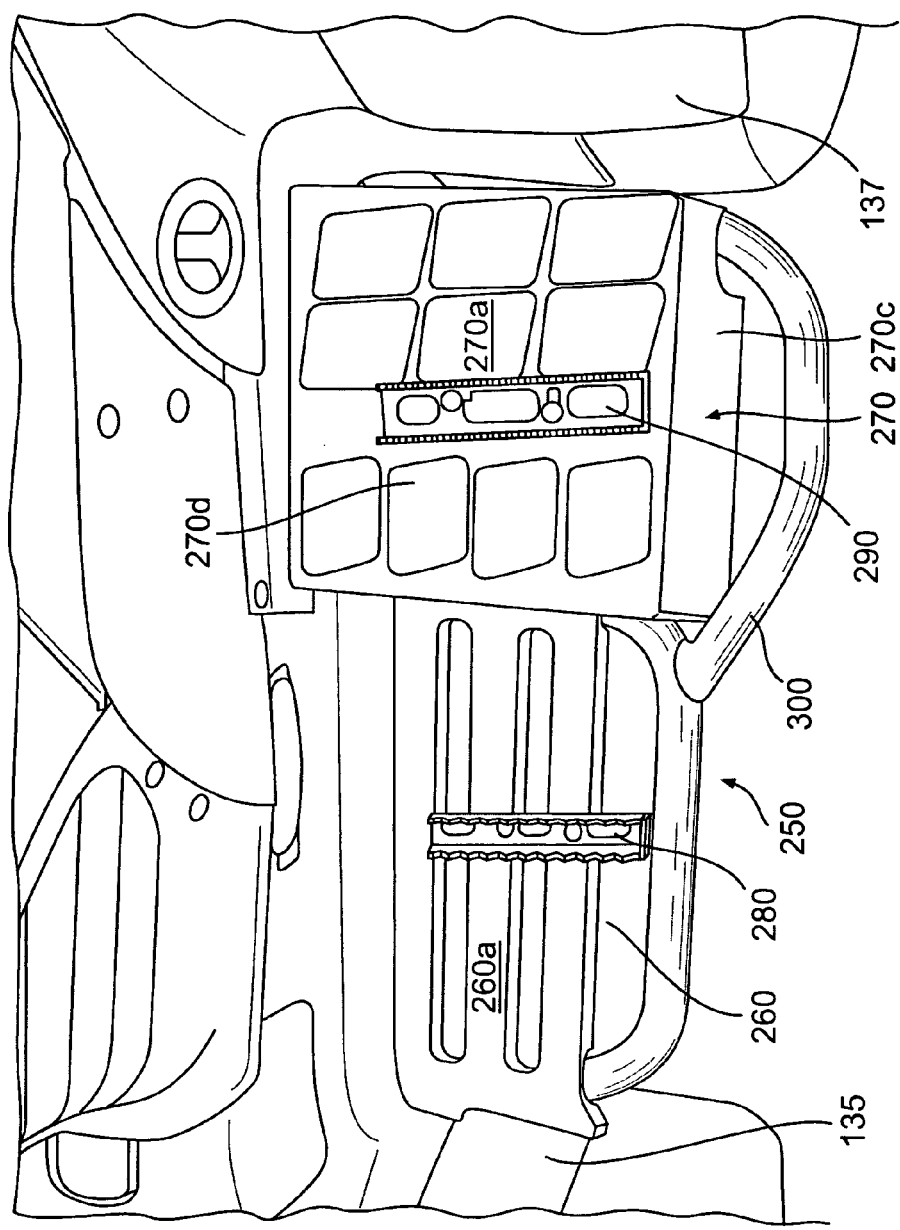
FIG. 5B is a partial top perspective view of the left footrest of the ATV shown in FIG. 1.

As best illustrated in FIGS. 5A–5C, the rear footrest portion 270 preferably comprises a plurality of sheets of material that connect together to elevate the upper surface 270a relative to the upper surface 260a. The upper surface 270a is defined by an upper sheet member 270d of the rear footrest portion 270. The footrest portion 270 also includes a front, generally-planar, sheet member 270b, which extends vertically from a forward edge of the upper sheet member 270d to an upper rear edge of the front footrest portion 260. A side, generally-planar, sheet member 270c extends vertically from an outer lateral edge of the upper sheet member 270d to a side guard 300, which is described in greater detail below. The sheet members 270b, 270c, 270d preferably comprise sheet metal and may include holes and/or openings to reduce their weight without significantly adversely affecting their strength. The separate members 270b, 270c, 270d may be integrally formed by bending a unitary sheet of material, or may alternatively be welded, glued, bolted, or otherwise fastened together.

As best illustrated in FIG. 5A, the footrests 250 preferably extend over a full longitudinal distance F formed between the fenders/mudguards 135, 137. Because the wheelbase L of the ATV 100 is significantly longer than in conventional ATVs, the distance F between the fenders 135, 137 is also significantly longer than in conventional ATVs. The length F is preferably as large or larger than two average-sized shoes lined up end to end. Accordingly, the length F is preferably between 17 and 40 inches, is more preferably between 20 and 40 inches, is even more preferably between 25 and 35 inches, and is even more preferably about 30 inches. Such a length F allows the driver and passenger to both use the footrests 250 without interfering with each other's feet. Similarly, a ratio of the wheelbase L to the length F is preferably between 1 and 2.7, is more preferably less than 2.6, is even more preferably less than 2.5, and is even more preferably about 2.

As illustrated in FIGS. 1 and 5, right and left side guards (or side bumpers or tree guards or side rails) 300 preferably extend laterally outwardly from the frame 102 and/or footrests 250 to positions that are laterally outward from the outer lateral ends of the footrests 250. The side guards 300 preferably extend longitudinally from a forward end of the front footrest portion 260 to a rearward end of the rearward footrest portion 270. At least a portion of the side guards 300 also preferably extends laterally outwardly beyond the rear fenders 137. As best illustrated in FIGS. 5B and 5C, a middle portion of each side guard 300 angles laterally outwardly and upwardly as it progresses rearwardly. The illustrated side guards 300 provide support for the footrests 250. Accordingly, the upward angle of the middle portion of the side guards 300 preferably creates at least a portion of the gap X between the front and rear portions 260, 270 of the footrests 250. However, the side guards 300 and footrests 250 may alternatively be completely distinct.

Each of the illustrated side guards 300 preferably comprises strong, metallic, unitary, tubular members. The unitary member may be a composite of integrally connection sections. The integral connection between sections of each side guard 300 may be formed by welding, gluing, or using any other comparable permanent attachment mechanism. Alternatively, the unitary member may result from integral formation, such as would be the case if each side guard comprised a single, elongated, tubular member.

Each of the illustrated side guards 300 are designed to withstand an impact with a tree or other stationary object during operation of the ATV 100. If the driver steers the ATV 100 too close to a stationary object, the side guards 300 will contact the object and deflect the ATV 100 away from the object to prevent the object from squeezing laterally against and/or breaking fragile components of either the ATV 100 (e.g., the fenders 135, 137, the rear rack 130, or the grab handles 340) or, more importantly, the riders' arms and legs.

An open space 330 is provided in front of the main portion 140 of the seat 139. The open space 330 is provided to facilitate entry and exit from the ATV 100, as described in commonly assigned U.S. application Ser. No. 09/057,652, filed on Apr. 9, 1998, which is incorporated herein by reference in its entirety. Alternatively, the open space 330 could be provided just behind the main seat portion 140 and just in front of the secondary seat portion 145. Of course, an open space could be provided in front of the main portion 140 and in front of the secondary portion 145, to facilitate ingress/agress of both the driver and passenger. Alternatively, the open space 330 could be omitted entirely without deviating from the scope of the present invention.

Figure 4A:
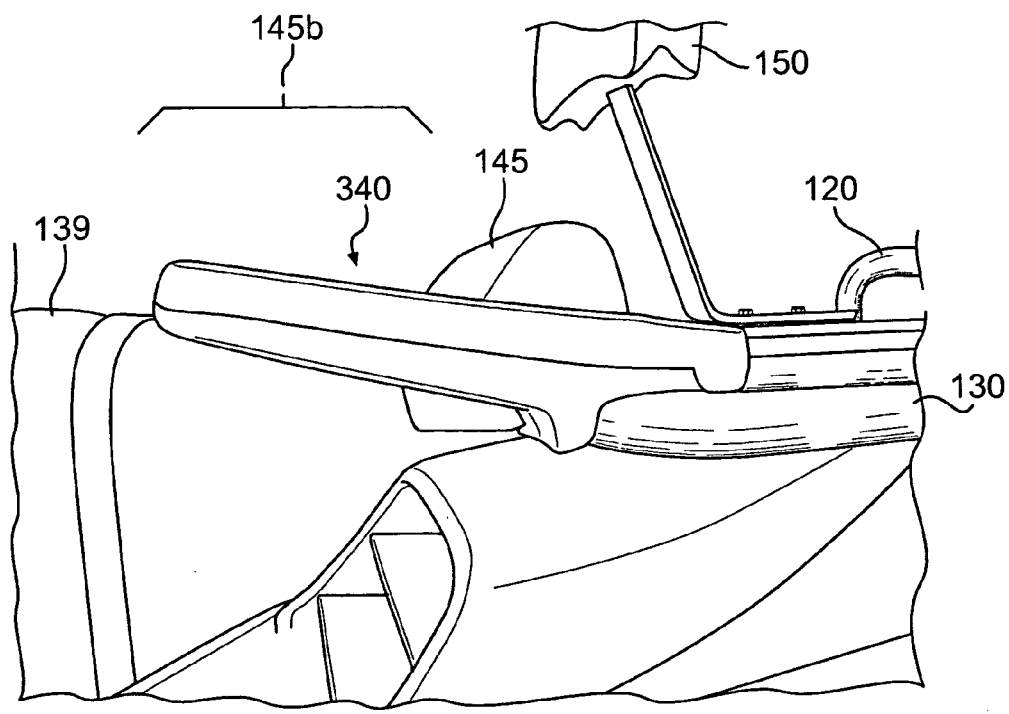
FIG. 4A is a partial left side view of a left passenger grab handle of the ATV shown in FIG. 1.
Figure 4B:
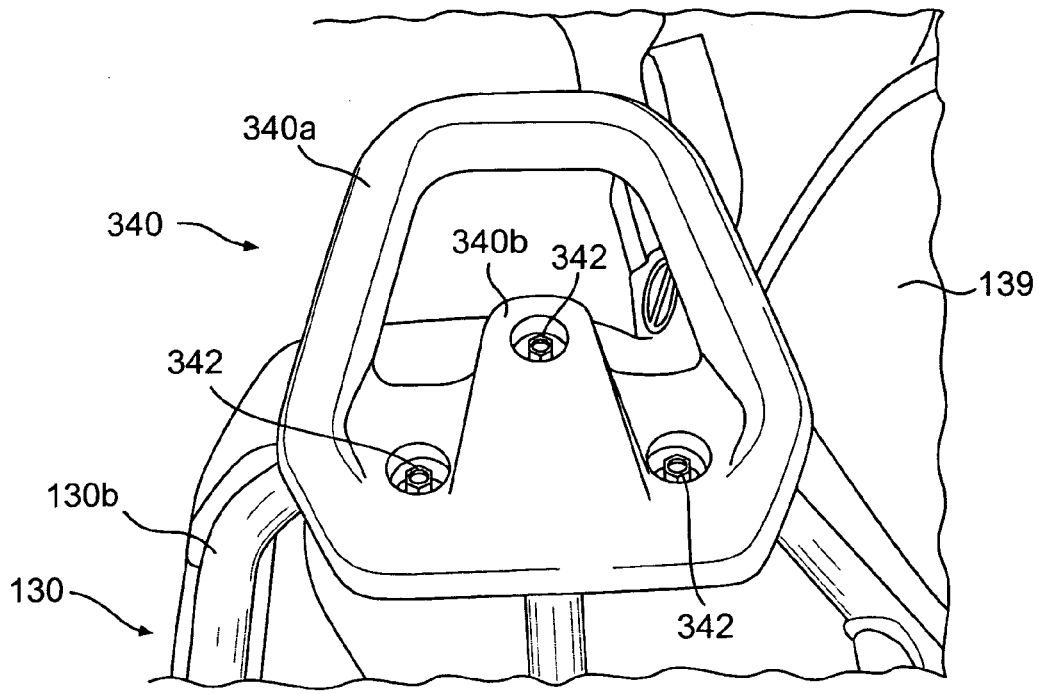
FIG. 4B is a partial top view of the left passenger grab handle of the ATV shown in FIG. 1.

As illustrated in FIGS. 1–3B, 3D, and 4A–4C, right and left grab handles 340 are provided on the right and left lateral sides of the secondary seat portion 145 to help the passenger sitting on the secondary seat portion 145 stabilize himself/herself during operation of the ATV 100. As best illustrated in FIGS. 3A and 4B, the grab handles 340 preferably do not extend laterally outwardly beyond the side guards 300 or the side members 130b of the rear rack 130. The illustrated grab handles 340 attach to and are supported by the rear rack 130, but may alternatively attach to any other suitable portion of the ATV 100 (e.g., directly to the frame, etc.). The grab handles 340 extend forwardly from a forward portion of the rear rack 130. In the illustrated embodiment, the grab handles 340 are clamped to the rear rack 130 with bolts 342 but may alternatively be attached to the rear rack 130 using a variety of other attachment techniques (e.g., integral formation with the rear rack, glue, direct bolts, welds, etc.). As illustrated in FIGS. 1 and 4A, the grab handles 340 are positioned at roughly the same longitudinal position as the secondary supporting range 145b of the secondary seat portion 145 to provide the passenger with easy access to the grab handles 340. Further, the grab handles 340 are preferably conveniently disposed at about the same height as the secondary supporting range 145b. Accordingly, while the grab handles 340 are high enough that the passenger can easily reach them while seated on the secondary seat portion 145, the grab handles 340 are low enough that they do not significantly interfere, if at all, with the lateral movement of the passenger's legs or with the passenger's ability to mount and dismount the ATV 100. Consequently, if the ATV 100 happens to roll over, the grab handles 340 will not trap the passenger on the ATV 100. Furthermore, the combination of physical freedom and support that the grab handles 340 provide the passenger help to enable the passenger to comfortably and actively position himself/herself while riding the ATV 100.

Figure 4C:
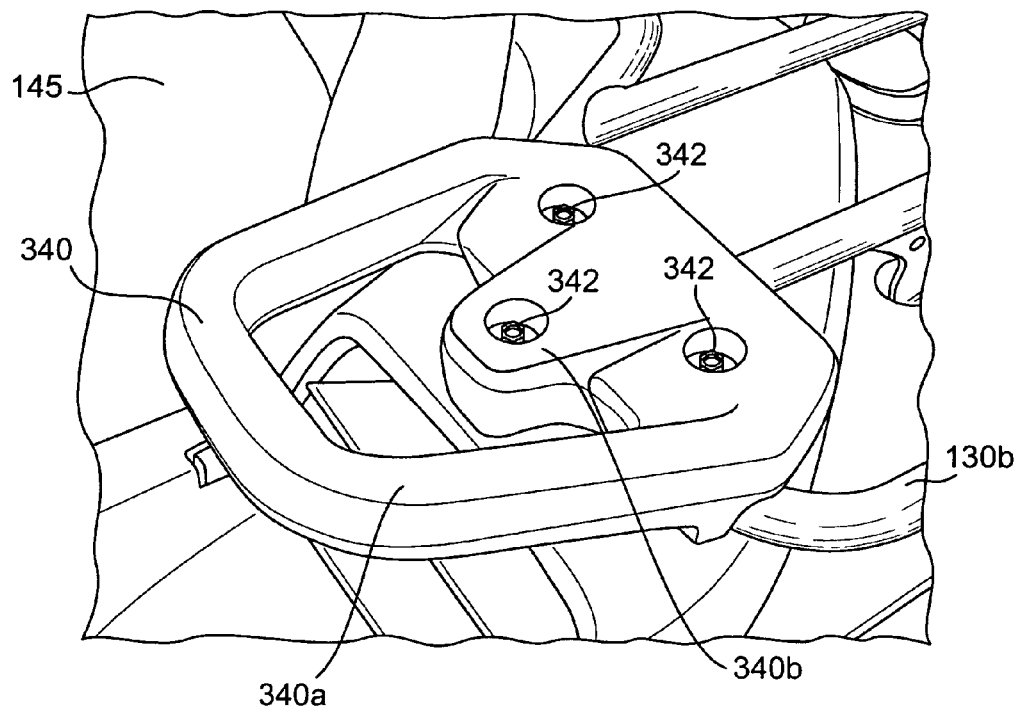
FIG. 4C is a partial perspective view of the left passenger grab handle of the ATV shown in FIG. 1.

As best illustrated in FIGS. 4B and 4C, the grab handle 340 preferably includes a ring-shaped portion 340a that provides a variety of gripping portions that the passenger can easily, firmly grip with his/her hands. The grab handle 340 may also include a gripping knob 340b disposed within the opening inside the ring-shaped portion 340a. The passenger may grab onto the gripping knob 340b or the ring-shaped portion 340a to help stabilize and actively position himself/herself on the ATV 100 while riding. If the passenger uses the gripping knob 340b instead of the ring-shaped portion 340a of the grab handle 340, the ring-shaped portion 340a may function as a hand guard to prevent the passenger's hands from hitting objects such as branches that the ATV 100 brushes by during operation. While the illustrated grab handle 340 includes a ring-shaped portion 340a and a gripping knob 340b, a variety of alternatively shaped grab handles may also be used without deviating from the scope of the present invention.

The ring-shaped portion 340a of the grab handle 340 is preferably flexible enough that it can deform when a passenger dismounts the secondary seat portion 145 and yet rigid enough that the ring-shaped portion 340a can provide sufficient support for the passenger. The grab handles 340 preferably comprise metal portions that are covered with a resilient material such as rubber or plastic. The ring-shaped portion 340a may be blow molded and hollow so that it provides the needed flexibility and strength. The ring-shaped portion 340a preferably comprises a resilient material such as rubber or plastic. The resilient material preferably provides a more comfortable grip for the passenger than a hardened, purely metal, grab handle.

The grab handles 340 may be heated to provide the passenger with added comfort during cold weather use. Electric heating elements (not shown) may be mounted to or in the grab handles 340 and operatively connected to the ATV's electrical system so as to provide the desired electric heating.

While the illustrated grab handles 340 extend generally horizontally (i.e., their horizontal component is substantially greater than their vertical component) on the ATV 100, the grab handles 340 could alternatively extend upwardly on either side of the secondary seat portion 245. The location and orientation of such grab handles may be similar to the grab handles described in commonly assigned U.S. Provisional Application Serial No. 60/354,968, titled "QUICK RELEASE PASSENGER SEAT WITH FLEXIBLE GRAB HANDLE," filed on Feb. 11, 2002, which is incorporated herein by reference in its entirety. Such grab handles may still be mounted to the rear rack 130 or to the top of the rear fenders 137.

FIG. 10 illustrates alternative grab handles 344 that may replace the grab handles 340. The grab handles 344 each comprise generally U-shaped, tubular members 346. The ends of the U-shaped members 346 extend rearwardly and attach to the front end of the rear rack 130 via bolts, welds, etc. The tubular members 346 may comprise metal tubes. The forward portion of the U-shaped members 346 are preferably covered with a non-slip coating such as a resilient rubber cover 348 that enables the passenger to comfortably and securely grip the grab handles 344.

A gear shift 350 is provided on the left hand of the steering column of the handlebars 134. The gear shift 350 is movable between various positions, including a park position (P), neutral (N), drive (H, L) and reverse (R).

Figure 15:
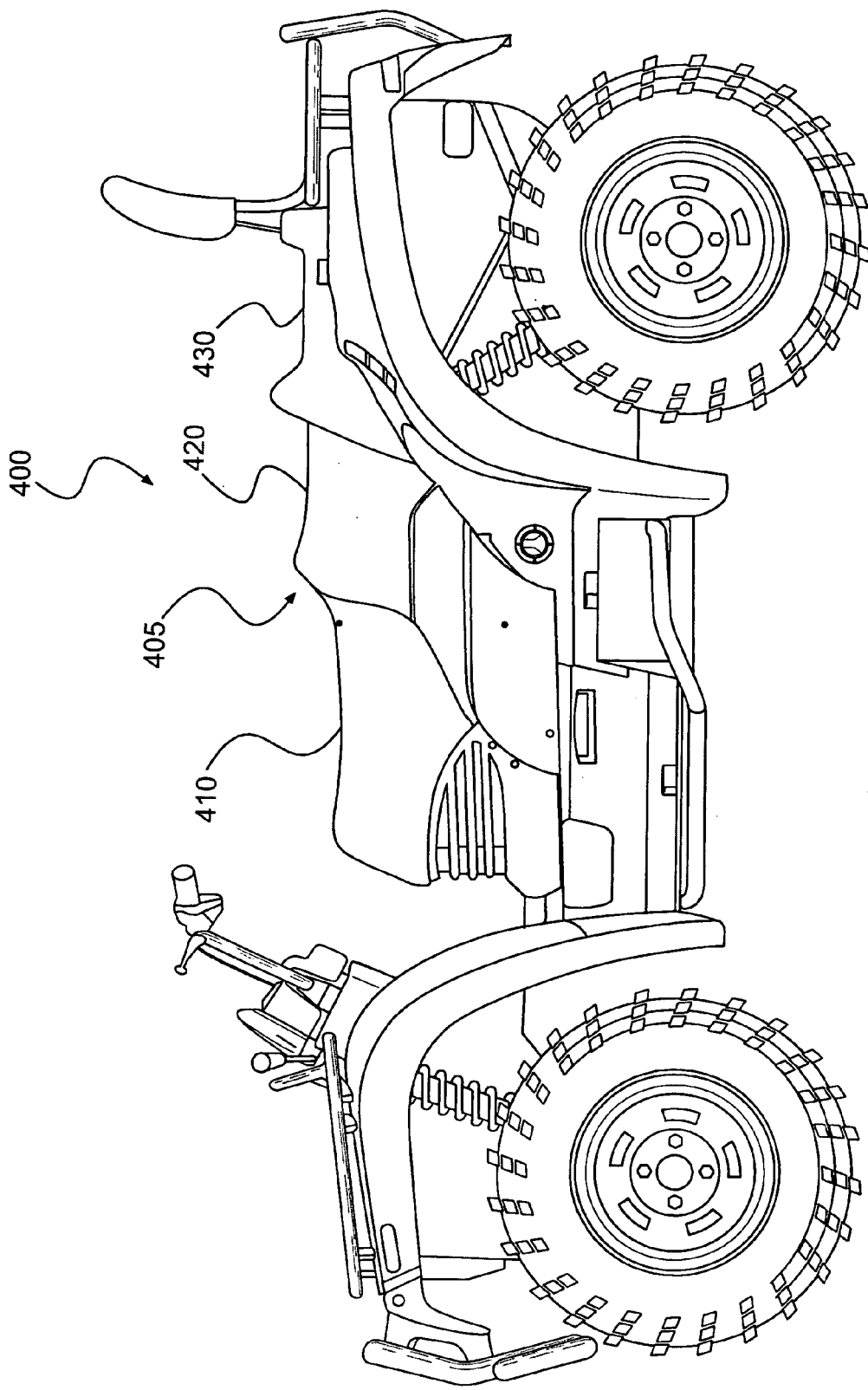
FIG. 15 is a left side view of a three person ATV according to an alternative embodiment of the present invention.

As illustrated in FIG. 15, the two-person ATV 100 may be modified to accommodate three or even more riders on an ATV 400. The two-person ATV 100 may be converted into the three-person ATV 400 by adding a longitudinal extension to the ATV 100 between the main and secondary seat portions 145. Accordingly, a seat 405 of the ATV 400 includes a main seat portion 410 for a driver, a secondary seat portion 420 for a first passenger, and a tertiary seat portion 430 for a second passenger. For each additional rider to be added, the wheelbase L, the length F, and the length S should each be increased (e.g., by 8 to 15 inches per rider). The lateral distance between the wheels 105, 110 should be set to give comfort and stability to the vehicle. Furthermore, for each additional passenger, the straddle-type seat 139 should include an additional passenger seat portion and the footrests 250 should include an additional, appropriately positioned footrest portion. The power unit 215 would be longitudinally positioned to optimize the ATV's center of gravity based on a weighted average of the proportional occupancy time for each seat portion.

While the preferred embodiments include many features, the scope of the present invention is not limited to the combination of every one of the features. Rather, the invention may comprise any combination of one or more of these features (e.g., elongated wheelbase, improved ATV center of gravity, centrally located brake actuating system, passenger seat, passenger seat positioning, driver seat, driver seat positioning, backrest, elongated and/or stepped footrests, side grab handles, low passenger positioning, tapering driver and passenger seat portions, side guards, open storage space on top of the rear rack, facilitation of active positioning for the driver and/or passenger, etc.).

While preferred embodiments have been discussed with reference to specific features therein, it is to be understood that the preferred embodiments are examples only and that other preferred embodiments would be apparent to those of ordinary skill in the art without falling outside the spirit and scope of the present invention.

What is claimed is:

1. An ATV comprising:
   a frame;
   at least four wheels suspended from the frame, at least two of which are front wheels, and at least two of which are rear wheels,
   the front wheels defining a front axis and the rear wheels defining a rear axis,
   the front axis and the rear axis defining therebetween a wheelbase between 52 and 72 inches;
   a suspension connecting the front wheels to the frame;
   a power unit for driving at least one of the wheels;
   a straddle-type scat supported by the frame,
   the seat including a main seat portion and a secondary seat portion,
   the main seat portion being dimensioned to support a standard driver having the dimensions and weight of a 50th-percentile human male,
   the secondary seat portion being disposed rearwardly of and adjacent to the main scat portion and being dimensioned to support a standard passenger having the dimensions and weight of a 50th-percentile human male;
   handlebars disposed on the frame for steering at least one of the wheels;

right and left footrests connected to the frame, each including a front footrest for a driver of the ATV and a rear footrest for a passenger of the ATV;

a pair of passenger grab handles disposed on right and left sides of the secondary seat portion; and a back rest provided for the secondary seat portion, the back rest including a back supporting front surface, the back supporting front surface being resiliently mounted on the ATV to deflect longitudinally when subjected to a longitudinal load.

2. The ATV of claim 1, wherein each of the at least four wheels includes a tire, and each of the tires has an air pressure of less than 1 kg/cm2.

3. The ATV of claim 1, wherein the back supporting front surface positioned in front of the rear axis.

4. The ATV of claim 3, wherein the back-supporting front surface of the back rest is positioned is front of the rear axis by over 1 inch.

5. The ATV of claim 4, wherein the back-supporting front surface of the back rest is positioned in front of the rear axis by over 3 inches.

6. The ATV of claim 1, wherein the back supporting front surface further comprises a longitudinal adjustment.

7. The ATV of claim 1, wherein the back rest is biased towards the front of the ATV.

8. The ATV of claim 7, further comprising at least one back rest support that extends between the back rest and the frame.

9. The ATV of claim 8, wherein the at least one back rest support comprises two laterally-spaced back rest supports that extend between laterally-spaced portions of the back rest and the frame.

* * * * *